United States Patent
Landry

(10) Patent No.: US 11,870,480 B2
(45) Date of Patent: Jan. 9, 2024

(54) PRIVACY APPARATUS FOR ELECTRONICS AND RELATED METHODS

(71) Applicant: Jonathan Philip Landry, Avon, CT (US)

(72) Inventor: Jonathan Philip Landry, Avon, CT (US)

(*) Notice: Subject to any disclaimer, the term of this patent is extended or adjusted under 35 U.S.C. 154(b) by 0 days.

(21) Appl. No.: 18/085,616

(22) Filed: Dec. 21, 2022

(65) Prior Publication Data
US 2023/0122512 A1    Apr. 20, 2023

Related U.S. Application Data

(63) Continuation of application No. PCT/US2021/041479, filed on Jul. 13, 2021, which is
(Continued)

(51) Int. Cl.
*H04B 1/3888* (2015.01)
*H04W 4/80* (2018.01)
(Continued)

(52) U.S. Cl.
CPC .......... *H04B 1/3888* (2013.01); *H04W 4/023* (2013.01); *H04W 4/80* (2018.02); *H04W 12/02* (2013.01); *H04W 12/63* (2021.01)

(58) Field of Classification Search
CPC ...... H04B 1/3888; H04W 4/80; H04W 12/63; H04W 4/023; H04W 12/02
(Continued)

(56) References Cited

U.S. PATENT DOCUMENTS 8,385,974 B1 * 2/2013 Bishop ................ H04M 1/0281
455/556.1
8,731,186 B1 * 5/2014 Haddad .................... H04R 1/08
379/433.03
(Continued)

FOREIGN PATENT DOCUMENTS

CN         2534743 U    2/2003
KR     101323278 B1   10/2013
(Continued)

OTHER PUBLICATIONS

Malarie Golkey, Ipatch Case for Iphone Protects Your Camera Lens and Privacy, Jun. 30, 2014. Printed from internet site (http://www.digitaltrends.com/mobile/ipatch-case-protects-iphone-camera-lens/) on Sep. 11, 2015. Attached.
(Continued)

*Primary Examiner* — April G Gonzales
(74) *Attorney, Agent, or Firm* — LAW OFFICE OF RAMON URTEAGA

(57) ABSTRACT

An apparatus for enveloping a portable communication or storage device having one or more camera lenses for taking digital impressions, a power switch, and an interactive display. The apparatus has a plurality of walls defining and encasement that is configured to at least partially enclose the device, with that plurality of walls including one or more wall portions that are configured to overlie all of the one or more camera lenses. A lock of the apparatus is coupled to the encasement, with that lock having a locked state in which the lock hinders separation of the encasement from the device, and an unlocked state in which the lock permits unrestricted separation of the encasement from the device. In the locked state, the encasement provides unrestricted access to the power switch and substantially an entirety of the interactive display.

20 Claims, 16 Drawing Sheets

Related U.S. Application Data a continuation of application No. 16/989,381, filed on Aug. 10, 2020, now abandoned.

(51) Int. Cl.
  *H04W 12/63* (2021.01)
  *H04W 4/02* (2018.01)
  *H04W 12/02* (2009.01)

(58) Field of Classification Search
  USPC .................................................. 455/575.8
  See application file for complete search history.

(56) References Cited

U.S. PATENT DOCUMENTS

| | | | | |
|---|---|---|---|---|
| 9,031,610 | B2* | 5/2015 | Kulas | H04M 1/0264 455/575.8 |
| D751,058 | S | 3/2016 | Cocchia et al. | |
| 9,369,170 | B2* | 6/2016 | Sorrentino | H04B 1/3888 |
| 9,813,101 | B1* | 11/2017 | Landry | H04M 1/72463 |
| 9,866,255 | B1* | 1/2018 | Ketter-Muldrow | A45C 11/00 |
| 9,992,884 | B2* | 6/2018 | Williams | G06F 21/86 |
| 10,623,957 | B2* | 4/2020 | Dugoni | H04M 1/667 |
| 2007/0212059 | A1* | 9/2007 | Kim | G03B 11/043 396/448 |
| 2011/0058255 | A1* | 3/2011 | Weiss | H04N 23/50 359/511 |
| 2011/0128384 | A1* | 6/2011 | Tiscareno | H04N 23/663 348/E5.09 |
| 2012/0282977 | A1* | 11/2012 | Haleluk | H04B 1/3888 455/556.1 |
| 2013/0316690 | A1* | 11/2013 | Wildner | H04W 8/22 455/575.8 |
| 2014/0041425 | A1* | 2/2014 | Pinzon | A45C 11/00 70/344 |
| 2015/0018056 | A1* | 1/2015 | Gillikin | H04M 1/04 455/575.8 |
| 2015/0059251 | A1* | 3/2015 | Rinner | G06F 21/83 49/465 |
| 2015/0077530 | A1* | 3/2015 | Jang | H04N 13/398 348/56 |
| 2015/0163385 | A1* | 6/2015 | Haddad | G03B 17/565 348/374 |
| 2015/0311941 | A1* | 10/2015 | Sorrentino | H04B 1/3888 455/575.8 |
| 2016/0042202 | A1* | 2/2016 | Murray | H04M 1/04 320/108 |
| 2016/0082897 | A1* | 3/2016 | Mouser | H04N 7/183 348/148 |
| 2016/0316053 | A1* | 10/2016 | Dugoni | H04W 12/08 |
| 2018/0048343 | A1* | 2/2018 | Landry | H04M 1/72463 |

FOREIGN PATENT DOCUMENTS

| | | |
|---|---|---|
| KR | 20150097249 A | 8/2015 |
| KR | 101940671 B1 | 12/2018 |

OTHER PUBLICATIONS

International Search Report and Written Opinion in related International Application No. PCT/US2021/041479, dated Nov. 2, 2021. Attached.

Office Action in related U.S. Appl. No. 16/989,381, dated Feb. 3, 2022. Attached.

* cited by examiner

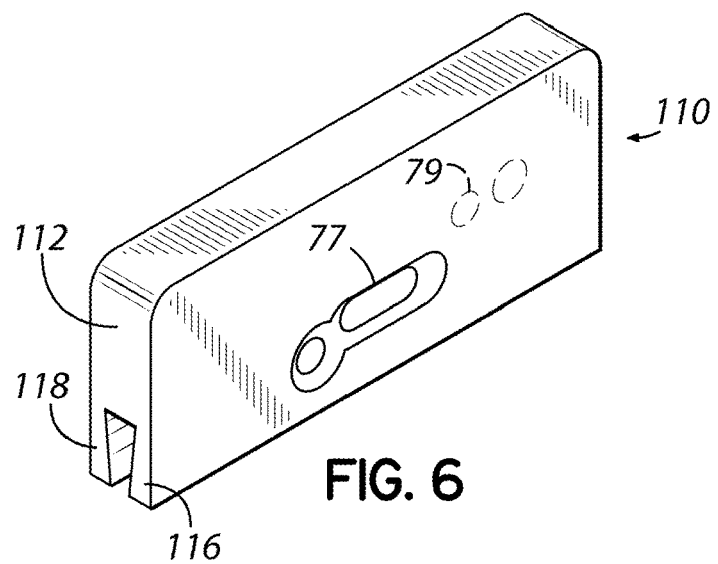
FIG. 6
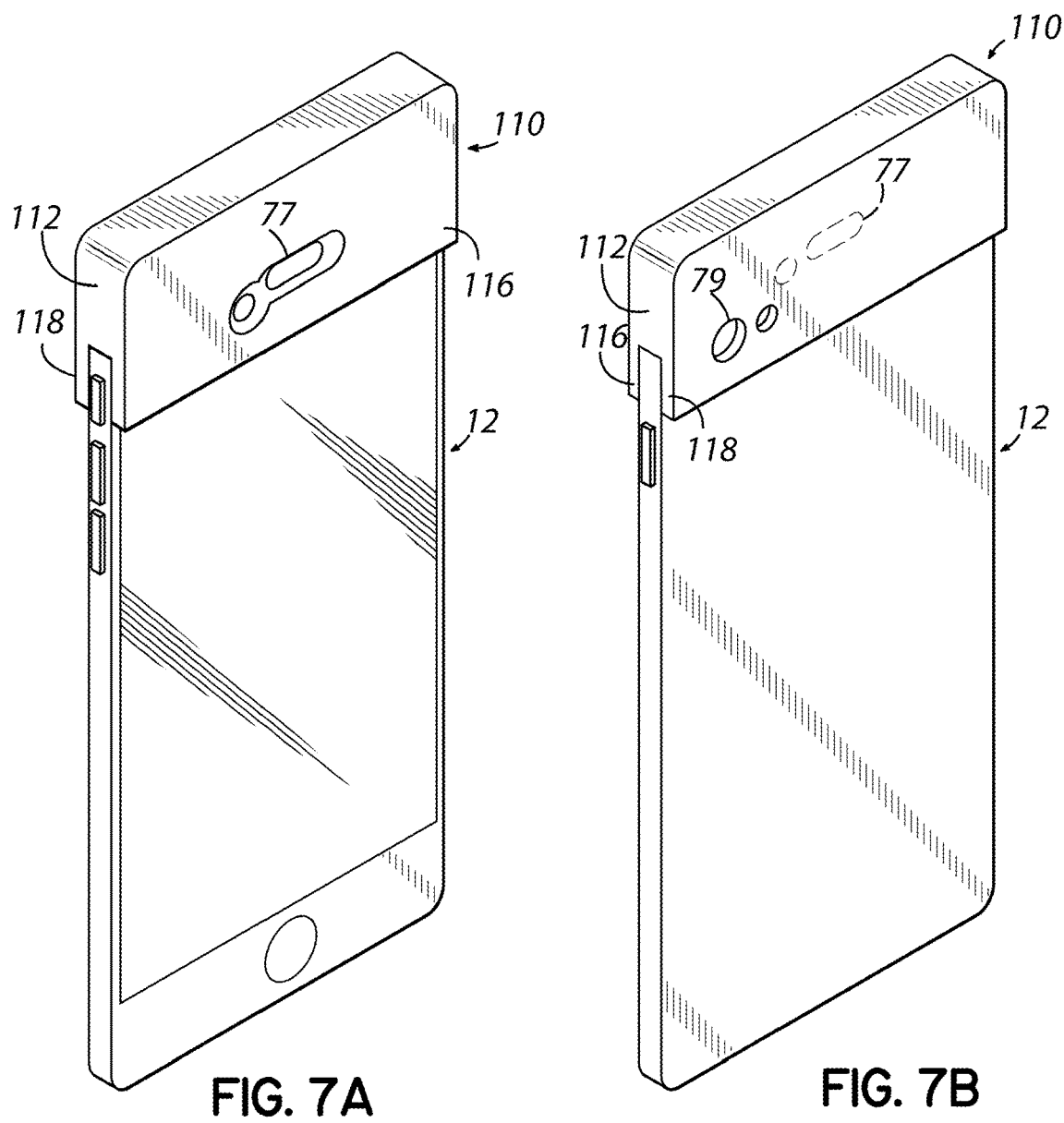
FIG. 7A
FIG. 7B

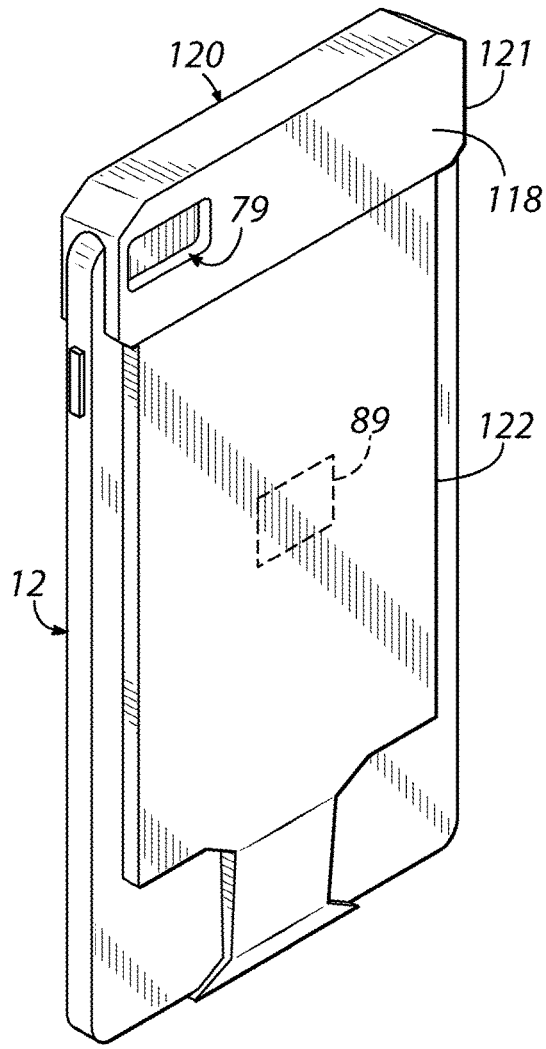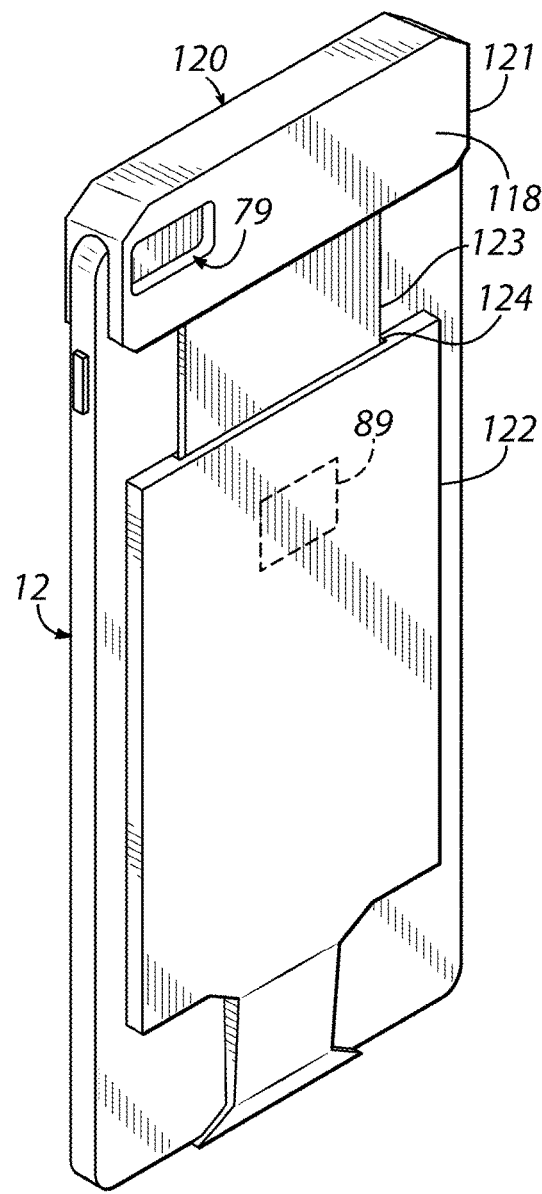
FIG. 8A
FIG. 8B

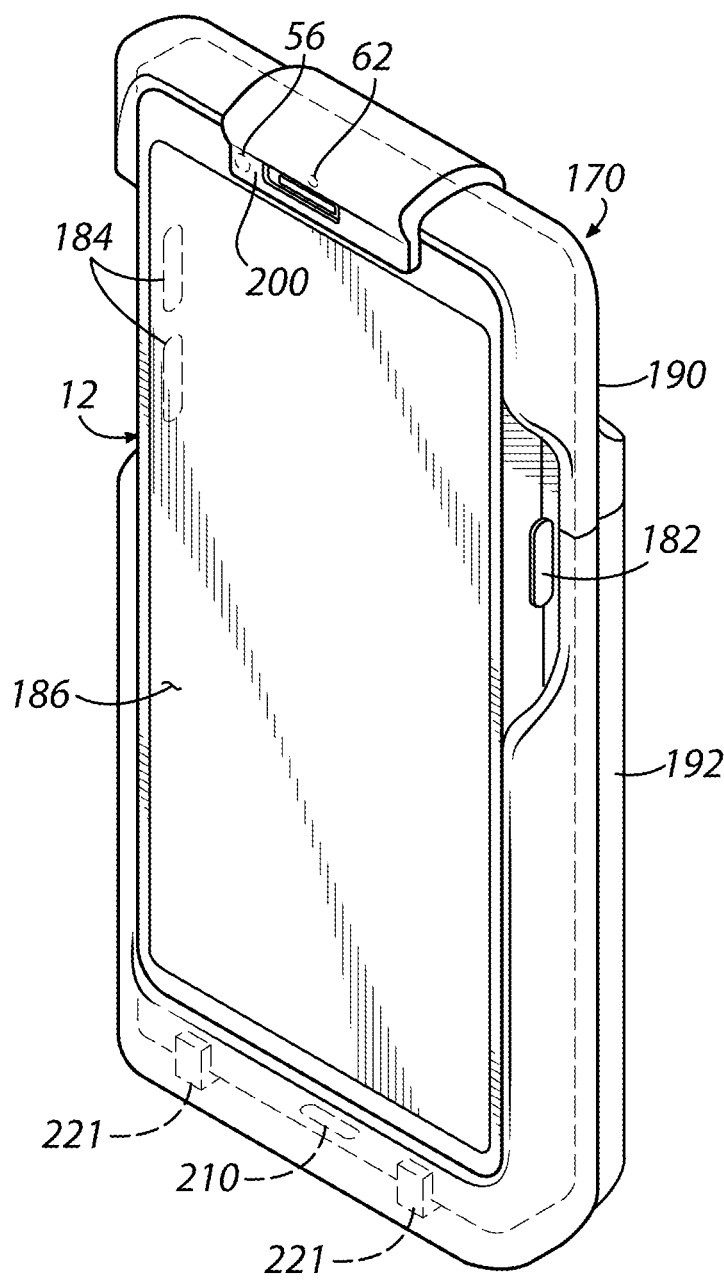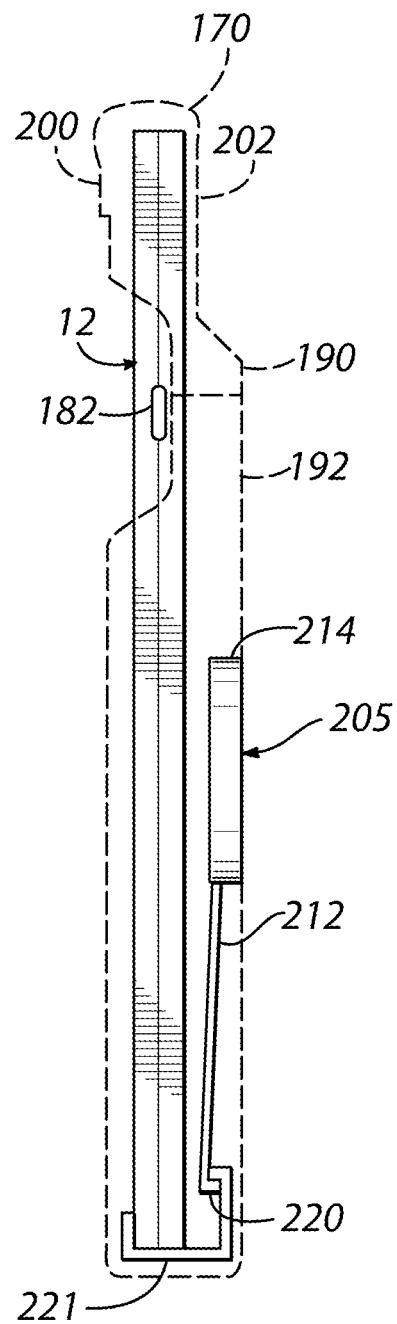
FIG. 12C
FIG. 12D

PRIVACY APPARATUS FOR ELECTRONICS AND RELATED METHODS

CROSS-REFERENCE TO RELATED APPLICATIONS

This application is a bypass continuation of International Application No. PCT/US2021/41479, filed Jul. 13, 2021, which is a continuation of and claims the filing date benefit and priority of U.S. patent application Ser. No. 16/989,381, filed Aug. 10, 2020, now abandoned, both of which applications being titled Privacy Apparatus for Electronics and Related Methods. The entire contents of both of those applications are hereby incorporated by reference herein.

TECHNICAL FIELD

The present disclosure is generally related to electronic apparatus and, more particularly, to electronic apparatus used to envelop portable communication and/or storage devices such as tablets, mobile phones, or smartwatches.

BACKGROUND

Known portable communication and/or storage devices such as tablets or mobile phones are typically found in controlled environments, such as the workplace, and their use permitted and sometimes even encouraged as a means of communication among individuals operating in those environments (e.g., coworkers) and with the outside world. Devices of the type described above are often capable of taking, storing, and even transmitting digital impressions, such as digital photographs, digital audio, and/or digital video. That capability could however be problematic in particular controlled environments.

For example, hospitals and other medical-services establishments often operate under strict privacy-based regulatory frameworks that make the unauthorized sharing and/or transmission of digital images outside of the establishment a potential source of liability. More specifically, for example, the external, unauthorized sharing, and/or transmission of a digital image depicting a patient's body may be found to violate that patient's privacy rights, and the establishment may face undesired consequences as a result. This is more so in view of the ubiquitous nature of mobile phone use and the increased capability of mobile phones, which may inadvertently result in a digital image being broadly shared through social media, for example.

Likewise, manufacturing sites often carry out manufacturing operations that are intended to remain secret, so as to prevent competitors from gaining an unfair competitive advantage from learning the details of those operations. While the use of portable communication and/or storage devices in the interior of those manufacturing sites may be encouraged—so as to foster communication between technical personnel, for example—it may lead to the unauthorized sharing of digital impressions with the outside world, and the information falling into the hands of a competitor. In another non-limiting example, finance-related facilities may be exposed to the unauthorized taking and even the unauthorized sharing of digital impressions containing social security numbers or other sensitive financial information.

Yet in another example, high-security areas such as certain sections of an airport or other government-controlled facilities may face similar challenges from exposure to portable communication and/or storage devices having the functionality described above.

It would be desirable, therefore, to address the shortcomings described above as well as others in connection with the use of portable communication and/or storage devices typically found in controlled environments.

SUMMARY

In one embodiment, an apparatus is disclosed for enveloping a portable communication or storage device that has one or more camera lenses for taking digital impressions, a power switch, and an interactive display. The apparatus has a plurality of walls defining and encasement that is configured to at least partially enclose the portable communication or storage device, with that plurality of walls including one or more wall portions that are configured to overlie all of the one or more camera lenses. A lock of the apparatus is coupled to the encasement, with that lock having a locked state in which the lock hinders separation of the encasement from the portable communication or storage device, and an unlocked state in which the lock permits unrestricted separation of the encasement from the portable communication or storage device. In the locked state, the encasement provides a user of the portable communication or storage device unrestricted access to the power switch, and also to substantially an entirety of the interactive display. Further, in the locked state, the encasement hinders the taking of digital impressions by the one or more camera lenses of the portable communication or storage device. In both the locked and unlocked states, the encasement continues to at least partially enclose the portable communication or storage device. Further in specific embodiments, the encasement is free of shutters in the wall portions that are configured to overlie the one or more camera lenses.

In a specific embodiment, the lock is separable from the encasement. The lock may be integrally formed with the encasement and/or the lock may be permanently coupled to the encasement. The encasement may include a controller and a proximity detector that is operatively coupled to the controller, with that proximity detector being configured to wirelessly detect whether the apparatus is within a threshold distance from the portable communication or storage device. The proximity detector may include a chip, with that chip being configured to wirelessly communicate with the portable communication or storage device to detect whether the encasement is within the threshold distance from the portable communication or storage device. The proximity detector may be a Near-Fields Communications (NFC) chip. Alternatively, the proximity detector may be a proximity sensor, which may further be one of a capacity proximity sensor, a photoelectric proximity sensor, or an inductive proximity sensor.

In a specific embodiment, the controller is configured to generate a signal to a remote server in response to the proximity detector detecting the encasement being within the threshold distance from the portable communication or storage device. Alternatively, the controller may be configured to generate a signal to a remote server in response to the proximity detector failing to detect the encasement being within the threshold distance from the portable communication or storage device. The threshold distance, in specific embodiments, corresponds to the portable communication or storage device being securely enveloped by the encasement. The encasement may include a readable chip associated with at least one of the plurality of walls for generating information about the apparatus. The readable chip may, for example, be a Near-Fields Communications (NFC) chip. In specific embodiments, the apparatus is free of any controllers operatively coupled to the readable chip. Additionally or alternatively, the readable chip may be free of any coupling to a power source.

The lock may include a wireless communication element, with that lock being configured to toggle between the locked and unlocked states in response to a signal received by the wireless communication element from a remote location, such as a remote computer or server. Additionally or alternatively, the lock may include a wireless communication element configured for communication with the portable communication or storage device, with the lock being configured to toggle between the locked and unlocked states in response to a signal received by the wireless communication element from the portable communication or storage device that is enveloped by the encasement.

In another embodiment, a privacy system is disclosed that includes a portable communication or storage device and an apparatus for enveloping that portable communication or storage device. In that privacy system, the portable communication or storage device has one or more camera lenses for taking digital impressions, as well as a power switch and an interactive display. The apparatus for enveloping the portable communication or storage device includes a plurality of walls defining an encasement configured to at least partially enclose the portable communication or storage device. That plurality of walls includes one or more wall portions that are configured to overlie all of the one or more camera lenses. The apparatus further includes a lock that is coupled to the encasement or at least configured to be locked with the encasement, with that lock having a locked state in which the lock hinders separation of the encasement from the portable communication or storage device, and an unlocked state in which the lock permits unrestricted separation of the encasement from the portable communication or storage device. In the locked state, the encasement provides a user of the portable communication or storage device unrestricted access to the power switch, as well as unrestricted access to substantially an entirety of the interactive display. In the locked state also, the encasement hinders the taking of digital impressions by the one or more camera lenses of the portable communication or storage device.

In another embodiment, an apparatus is disclosed for enveloping a portable communication or storage device that has one or more camera lenses for taking digital impressions, a power switch, and an interactive display. The apparatus has a plurality of walls configured to at least partially enclose the portable communication or storage device, with that plurality of walls including one or more wall portions that are configured to overlie all of the one or more camera lenses to prevent the taking of digital impressions with the one or more camera lenses. Those wall portions are free of selectively openable shutters. The walls of that plurality of walls are configured to provide the user of the portable communication or storage device unrestricted access to the power switch, and also to substantially an entirety of the interactive display of that portable device.

In yet another embodiment, a method is disclosed for controlling use of a portable communication or storage device in a controlled environment, with the portable communication or storage device having one or more camera lenses for taking digital impressions, a power switch, and an interactive display. The method includes at least partially enveloping the portable communication or storage device in an apparatus that has a plurality of walls including one or more wall portions configured to overlie all of the one or more camera lenses, as well as a lock that is coupled to the plurality of walls. The lock has a locked state in which the lock hinders separation of the one or more wall portions from the portable communication or storage device, and an unlocked state in which the lock permits unrestricted separation of the one or more wall portions from the portable communication or storage device.

The method further includes toggling the lock from the unlocked state to the locked state. In the locked state, the plurality of walls provides a user of the portable communication or storage device unrestricted access to the power switch, as well as to substantially an entirety of the interactive display. In the locked state also, the one or more wall portions hinder the taking of digital impressions by the one or more camera lenses of the portable communication or storage device.

BRIEF DESCRIPTION OF THE DRAWINGS

The objectives and features of the invention will become more readily apparent from the following detailed description taken in conjunction with the accompanying drawings in which:

FIG. 6 is a perspective view of an apparatus for at least partially enveloping a portable communication or storage device in accordance with another embodiment of the invention.

FIG. 7A is a perspective view of the apparatus of FIG. 6 partially enveloping a mobile phone, thereby defining a privacy system.

FIG. 7B is a view similar to FIG. 7A, showing a rear of the apparatus and mobile phone.

FIG. 8A is a perspective view of a privacy system including an apparatus at least partially enveloping a portable communication or storage device, in accordance with yet another embodiment of the invention.

FIG. 8B is a view similar to FIG. 8A, illustrating an extendable portion of the apparatus therein in an extended condition.

FIG. 12C is a front perspective view of the privacy system of FIGS. 12A and 12B.

FIG. 12D is a side elevation view of the privacy system of FIGS. 12A-12C, showing the encasing apparatus in phantom, for ease of understanding.

DETAILED DESCRIPTION OF PARTICULAR EMBODIMENTS

To the extent that any meaning or definition of a term in this written document conflicts with any meaning or definition of the term in a document incorporated by reference, the meaning or definition assigned to the term in this written document shall govern. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, as used herein, the term "releasable coupling" and related terms refer to a type of coupling in which the coupled structures may be readily detached, decoupled, or otherwise separated from one another in a simple manner and without causing the destruction or damage of any of those structures. For sake of further explanation, a permanent—rather than a "releasable"—type of coupling may refer, for example, to two structures that are integrally formed with one another, or which are adhesively attached, such that their separation would necessarily result in at least some level of damage to one or more of the parts being separated from one another.

Figure 5:
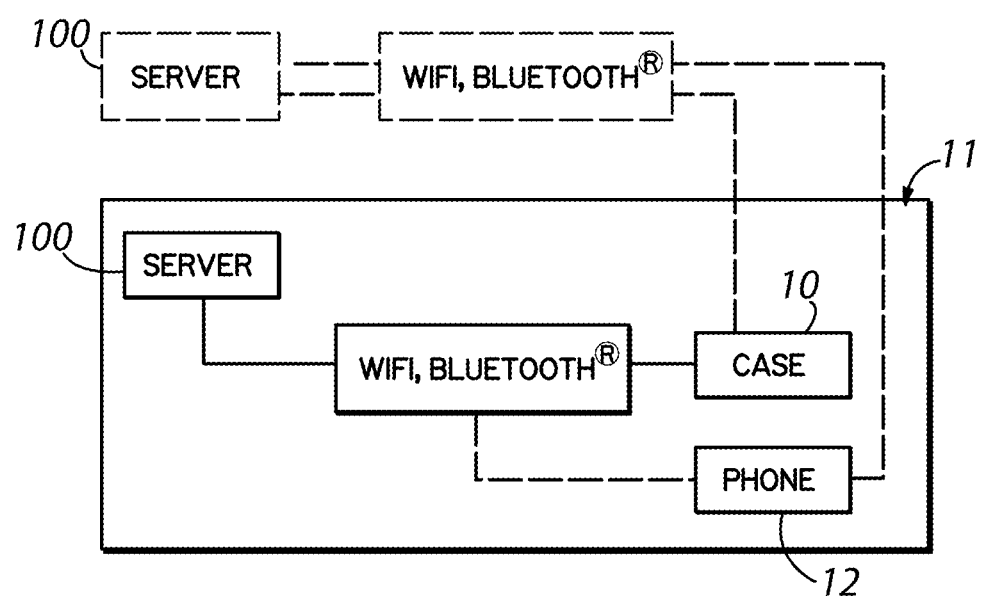
FIG. 5 is a schematic representation of a controlled environment in which the apparatus of FIGS. 1, 1A, 2A-2C, 3, and 4 may be used.

With reference to the figures, and particularly to FIGS. 1, 1A, 2A, 2B, and 2C, an illustrative apparatus in the form of an enclosure or case 10 is shown for use in a controlled environment (FIG. 5). Case 10 is configured to at least partially encase or envelop a portable communication and/or storage device in the form of a mobile phone 12. It is understood that, while the example embodiment illustrated described herein refers to a case 10 specifically configured to envelop or encase a mobile phone 12, the principles of operation, structure and functionality described in connection with that embodiment are similarly applicable to other types of portable communication and/or storage devices. For example, other embodiments may be sized, shaped, and configured to envelop or encase tablets or other small computers having the capability to take, store, and/or transmit digital impressions.

Similarly, other embodiments not shown in the figures may be sized and configured to envelop or encase portable communication and/or storage devices capable of taking, storing, and/or transmitting digital impressions and in the form of Augmented Reality ("AR") devices, optical head-mounted displays such as those commercially available under the Google Glass® trade name, or smartwatches such as those commercially available under the Apple Watch® trade name. The example case 10 of FIGS. 1, 1A, and 2A-2C at least partially envelops the mobile phone 12. Specifically, the case 10 has a plurality of walls that define an encasement configured to envelop substantially all surfaces of the mobile phone 12, with the exception of the front surface 14 of the mobile phone 12, which includes a user interface or interactive display 14x of that phone 12. As more fully explained below, the front surface 14 of the mobile phone 12 is only partially covered by a pair of walls in the form of top and bottom front sections 20, 22 of the case 10.

In the example embodiment shown in FIGS. 1, 1A, and 2A-2C, the case 10 is made up of first and second portions 24, 26 that, when fully coupled and/or engaged with one another, firmly encase the mobile phone 12. The first and second portions 24, 26 are hingedly coupled to one another so as to permit those two portions to at least partially separate when desired, so as to provide access to an interior volume 28 of the case 10. In the illustrated embodiment, pivotal movement of the first and second portions 24, 26 away from one another is effective to allow insertion of the mobile phone 12 into the interior volume 28 defined by the case 10, as well as to allow removal of the mobile phone 12 from the interior volume 28. In the illustrated embodiment, hinged coupling between first and second portions 24, 26 is defined by a pair of discontinuities in the form of slits or notches 30 located in a respective pair of side walls 33 of case 10.

Figure 1:
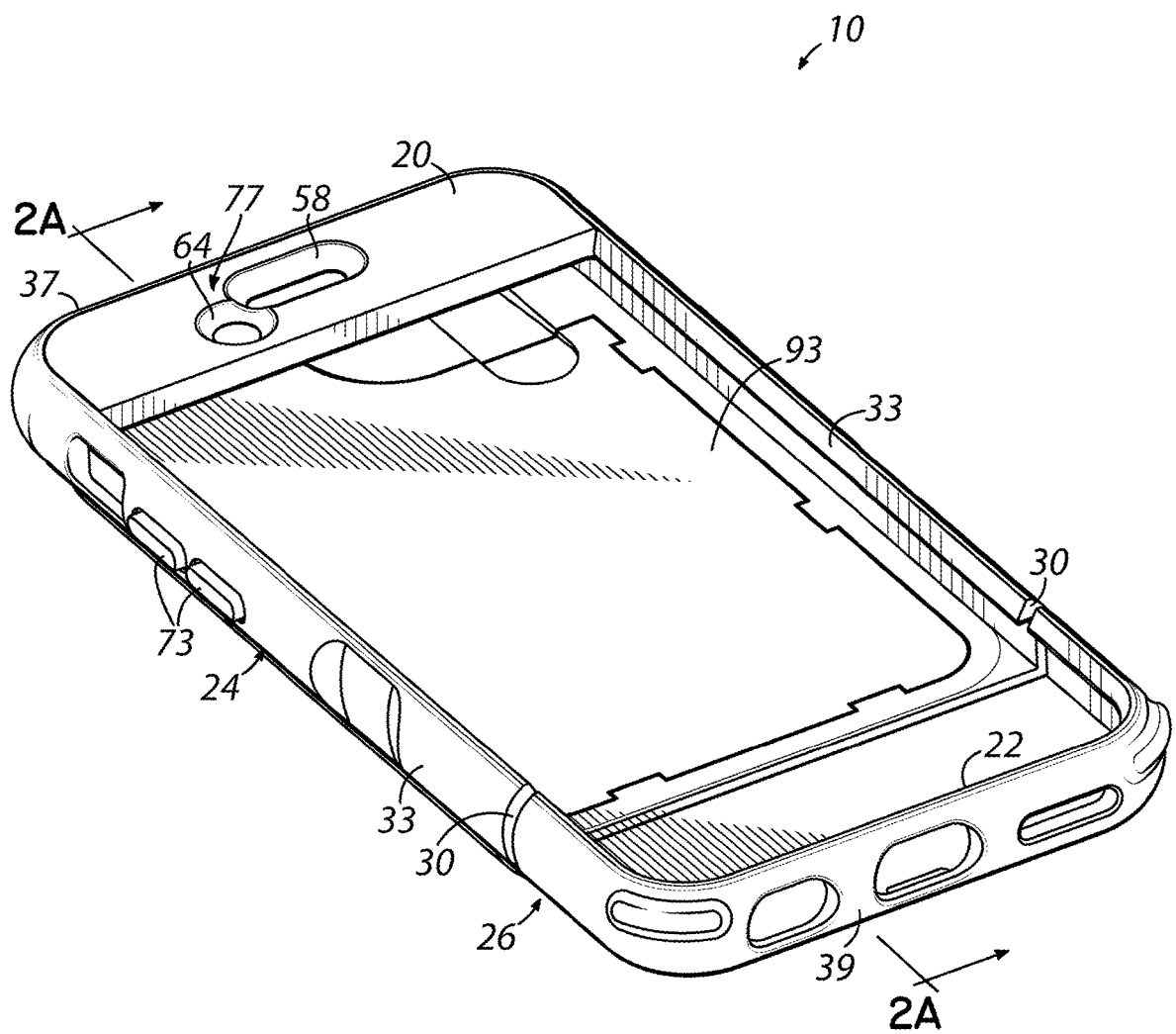
FIG. 1 is a perspective view of an apparatus for at least partially enveloping a portable communication or storage device in accordance with one embodiment of the invention.
Figure 1A:
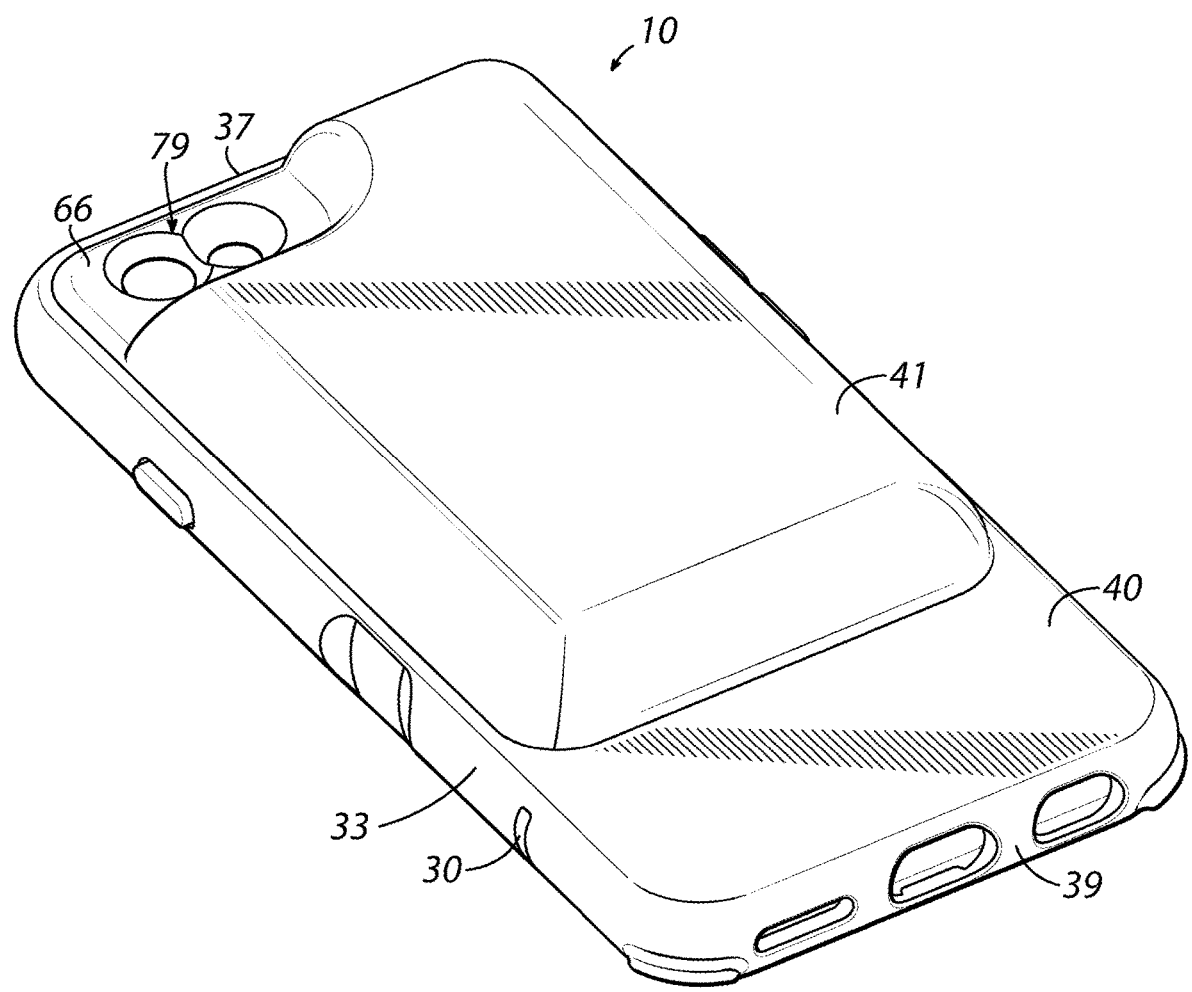
FIG. 1A is another perspective view of the apparatus of FIG. 1, illustrating a rear of that apparatus.
Figure 2A:
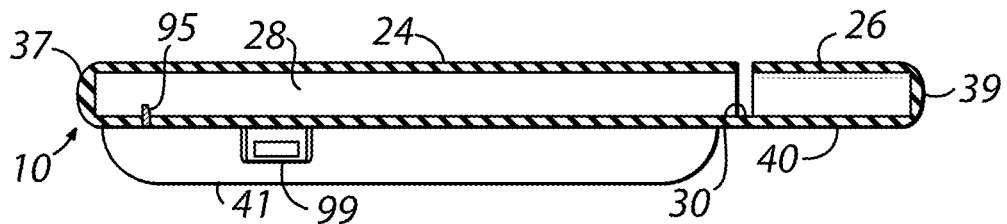
FIG. 2A is a cross-sectional view taken generally along line 2A-2A of FIG. 1.
Figure 2B:
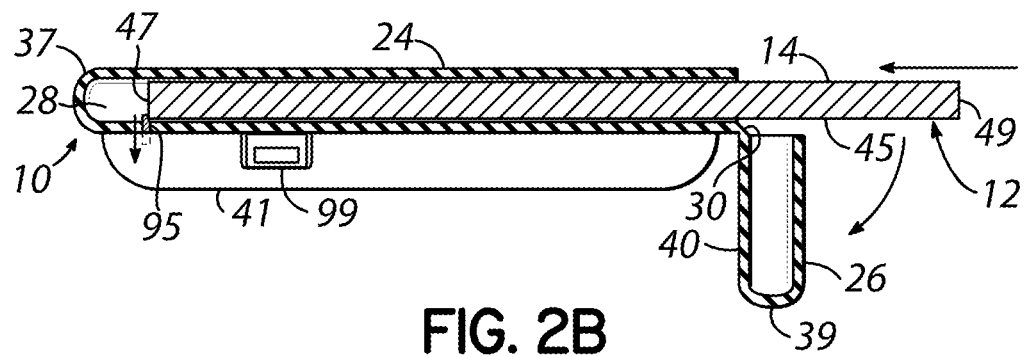
FIG. 2B is a view similar to FIG. 2A, illustrating insertion of a portable communication or storage device into an interior volume of the apparatus.
Figure 2C:
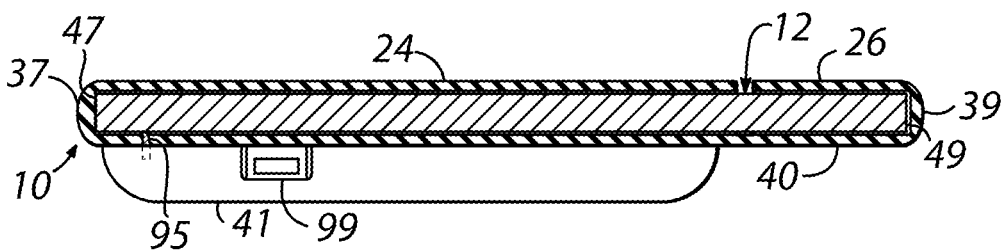
FIG. 2C is a view similar to FIGS. 2A and 2B illustrating the apparatus enclosing the portable communication or storage device.

Referring particularly to FIGS. 2A-2C, when it is desired to envelop the mobile phone 12 in case 10, the first and second portions 24, 26 are folded relative to one another, as schematically depicted in FIG. 2B. That figure illustrates folding of second portion 26 away from first portion 24, along the hinged coupling of those two portions 24, 26 defined by the slits or notches 30 in the side walls 33 of case 10. FIG. 2C illustrates the mobile phone 12 having been fully inserted into interior volume 28, and the case 10 having returned to its original shape, in which the first and second portions 24, 26 cooperate with one another to effectively envelop the mobile phone 12. Return of the case 10 to its original shape is facilitated, in the illustrated embodiment, by the resilient nature of the material(s) making up first and second portions 24, 26. In that embodiment, the side walls 33, as well as top and bottom walls 37, 39 and a back wall 40 of second portion 26 of case 10, are made up of a flexible, elastomeric material such as a thermoplastic polyurethane having a hardness durometer value in the range from about 70 to about 95. An elastomeric material as described above provides a suitable combination of flexibility, which allows easy folding of first and second portions 24, 26 relative to one another, and hardness, which may be desirable in order to protect electronic components of the case 10—described in further detail below—and to protect the mobile phone 12 itself from damage from inadvertent impact.

The materials making up the remainder of the case 10 are also suitably chosen, for example, to protect the electronic components housed in the interior of case 10, and/or to protect the mobile phone 12 from damage upon inadvertent impact. In the illustrated embodiment, and by way of example, the top front section 20, as well as a back wall 41 of first portion 24 of case 10, are made up of a hard plastic material, such as an acrylonitrile butadiene styrene (ABS) thermoplastic polymer. Making only certain parts of case 10 of a molded hard plastic may be desirable in order to minimize the need to redesign an entire case 10 so as to conform to a different model of phone or other portable communication and/or storage device. More specifically, the manufacturer of case 10 may wish to have one common molded hard-plastic part of the case 10, housing electronic components in its interior, that cooperates with a variety of interchangeable elastomeric parts of the case required for different types or models of phones or similar devices.

While the embodiment of FIGS. 1, 1A, and 2A-2C includes first and second portions 24, 26 that are hingedly coupled so as to only partially separate from one another, it is contemplated that the first and second portions 24, 26 could alternatively be completely separable from one another to allow insertion and removal of the mobile phone 12 respectively into and from the interior volume 28 defined by the case 10. In such embodiments, the first and second portions may for example be releasably coupled to one another through a snap-type of coupling. In one particular embodiment, not shown in the figures, the first and second portions 24, 26 are slidably coupled to one another, with sliding motion of those two portions relative to one another being effective to selectively join or separate those two portions 24, 26 of the case 10.

Alternative embodiments are also contemplated in which the case 10 is made of only one portion, or made of portions in a number greater than two. For example, and while not shown in the figures, the case 10 could be a unitary body made of a highly flexible material, with that case being able to bend in a manner that would permit easy insertion and removal of a mobile phone 12 respectively into and from the interior volume 28 of the case 10 through an opening in any of the walls of the case 10 or an opening defined by two or more of those walls.

Figure 3:
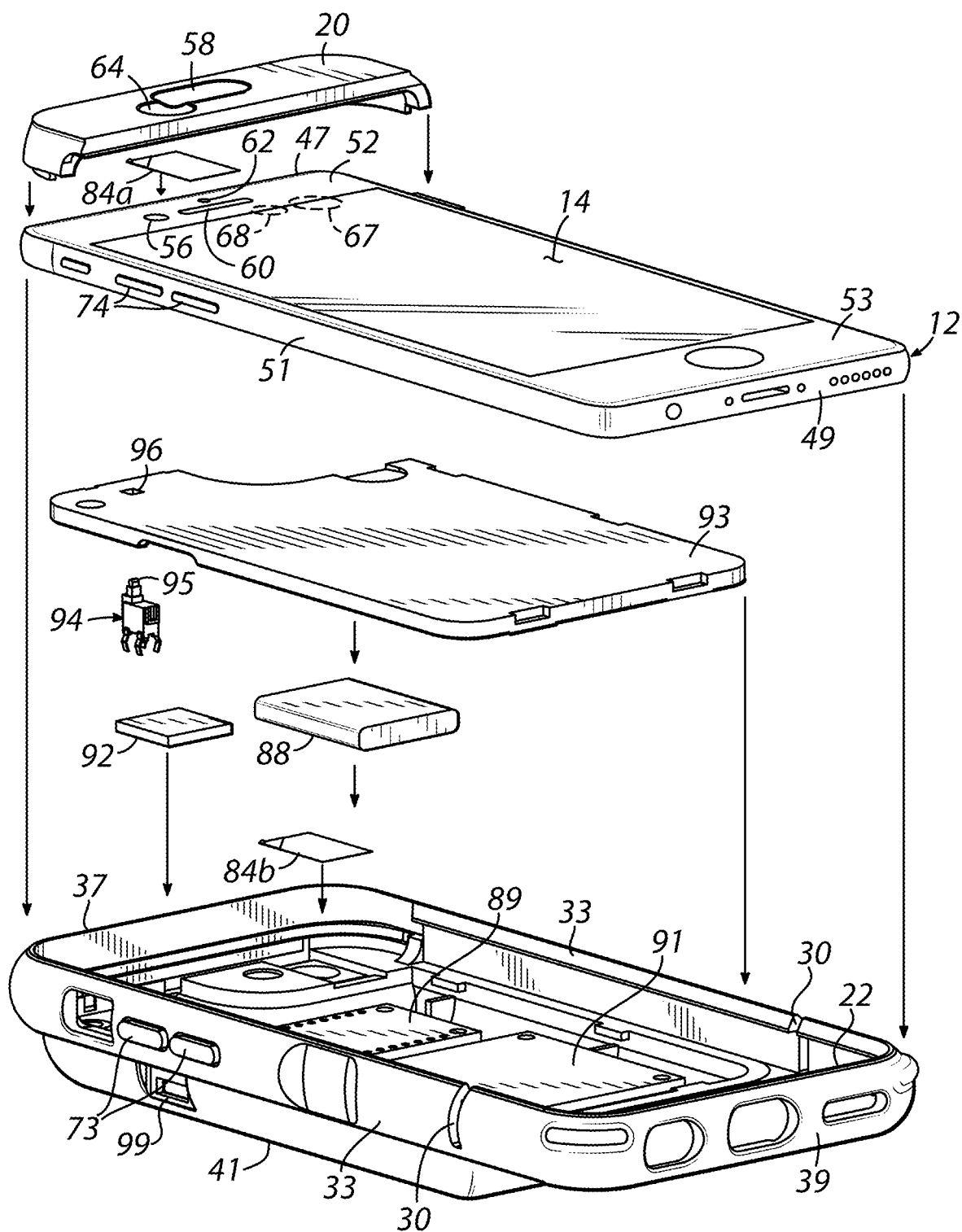
FIG. 3 is a partially disassembled perspective view of a device that includes the apparatus of FIG. 1 and a portable communication and/or storage device, in accordance with one embodiment of the invention.
Figure 4:
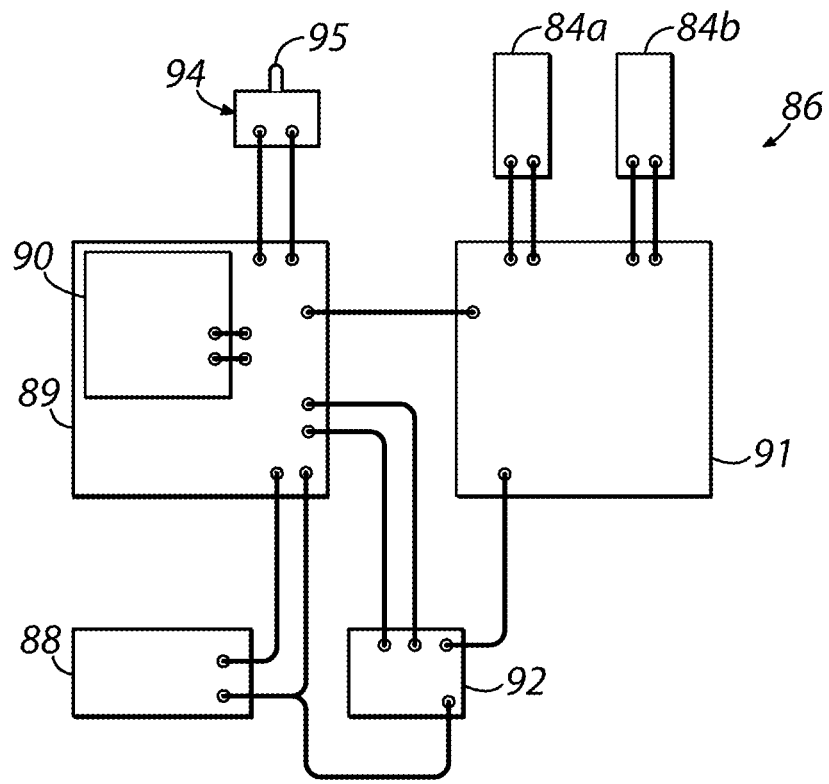
FIG. 4 is a schematic view of an electronic assembly or circuitry of the apparatus of FIGS. 1, 1A, 2A-2C, and 3.

With continued reference to FIGS. 1, 1A, and 2A-2C, and further referring to FIGS. 3 and 4, in the example case 10 of those figures, back walls 40, 41 lie adjacent the back surface 45 of the mobile phone 12, when the mobile phone 12 is enveloped by the case 10. Similarly, the top and bottom walls 37, 39 of case 10 lie adjacent the top and bottom surfaces 47, 49 of the mobile phone 12, while the side walls 33 of case 10 lie adjacent a corresponding pair of side surfaces 51 of phone 12. As discussed above, the case 10 also includes top and bottom front sections 20, 22 configured to partially cover a portion of the front surface 14 of the mobile phone 12. In the illustrated embodiment, the bottom front section 22 is relatively small, and takes the form of a lip extending from bottom wall 39. It is contemplated, however, that bottom front section 22 could instead have a larger area, for example, similar to that of the top front section 20. The top front section 20 in the illustrated embodiment spans between and is connected to the side walls 33 of the case 10, and is also connected to the top wall 37 of the case 10. The top front section 20 substantially overlies a top end section 52 of the front surface 14 of the mobile phone 12. The bottom front section 22 similarly spans between and is connected to the side walls 33 of the case 10, and it is also connected to the bottom wall 39 of the case 10.

The bottom front section 22 overlies a bottom end section 53 of the front surface 14 of the mobile phone 12. As shown in the figures, the top front section 20 of the case 10 is shaped so as to overlie a front camera lens 56 of the mobile phone 12, but includes—in the illustrated embodiment—an opening 58 configured to avoid blocking a speaker 60 and a proximity sensor 62 of the mobile phone 12, and another opening 64 configured to avoid blocking the front camera lens 56 of the mobile phone 12. These features allow the telephonic functionality of the mobile phone 12 to remain intact while the mobile phone 12 is enveloped by the case 10, for example by providing the user unrestricted access to at least substantially an entirety of the interactive display 14x. Similarly, the example case 10 has, as shown in the figures, a plurality of additional openings that allow access to power jacks, data ports or other media-related connection ports, such as audio jacks, of the phone 12. A top section 66 of the back wall 40 of the case 10 overlies a rear camera lens 67 and an associated LED light 68 of the mobile phone 12 that is used as a source of flash for that camera lens 67. The top section 66 of back wall 41 includes a pair of openings 69, 71 that respectively avoid blocking of the rear camera lens 67 and LED light 68. In alternative embodiments, a transparent or at least translucent element such as glass or clear plastic spans one or more of the openings 58, 64, 69, and 71, to prevent debris or the like to penetrate there through.

With continued reference to FIGS. 1, 2A-2C, 3, and 4, the example case 10 illustrated in those figures also includes a plurality of buttons 73 extending from the side walls 33 of the case 10, and which overlie a corresponding plurality of buttons 74 extending from the side surfaces 51 of the mobile phone 12. The buttons 73 on the side walls 33 are positioned so as to selectively engage, when pressed, the adjacent buttons 74 extending from the side surfaces 51 of the mobile phone 12, which for example may control the volume level of media being played by the mobile phone 12, or turn the display of the mobile phone 12 on or off. Alternative embodiments are contemplated in which the side walls 33 of the case 10 have apertures that permit the buttons 74 along the side surfaces 51 of the mobile phone 12 to extend through them, so as to permit the user to directly press those buttons 74 of the mobile phone 12.

Case 10 has features that selectively permit the mobile phone 12 enveloped by the case 10 to take digital impressions such as video or pictures/photographs. Specifically, the case 10 includes, in the top front section 20, a first shutter 77 that has a first condition that permits the taking of digital impressions by the front camera lens 56, and a second condition that prevents or at least hinders the taking of digital impressions by the camera lens 56. The top section 66 of the back wall 40 of the case 10 includes a second shutter 79 that also has a first condition that permits the taking of digital impressions by the rear camera lens 67, and a second condition that prevents or at least hinders the taking of digital impressions by the camera lens 67. As used herein, the term "hinders" and derivatives thereof refer to the ability of the shutters 77, 79 to produce digital impressions with the affected camera lens that are either of low quality, blurry, or of a size that is less than otherwise available. One or both of the first and second shutters 77, 79 may for example and without limitation, be an optical shutter such as an FOS-series model optical shutter, available from LC-Tec Displays AB in Borlänge, Sweden.

Alternatively, one or both of the first and second shutters 77, 79 may be an electrically-operated mechanical shutter that has—for example and without limitation—a retractable element and an actuator, with the actuator being capable of moving the retractable element between open and closed positions. The open position of the retractable element would correspond to the condition of the shutter that permits the taking of digital impressions, while the closed position would correspond to the condition of the shutter that at least hinders the taking of digital impressions by the camera lens that the retractable element selectively overlies. The retractable element in that embodiment may have a solid color and configured to totally block light to the camera lens that the retractable element selectively overlies, or it may alternatively be a translucent structure that only partially allows the transmission of light to the camera lens, to effectively hinder or obstruct the taking of digital impressions with that camera lens.

Other types of electrically or electronically-controlled shutters may also be used, so long as their structure and functionality allow those shutters to selectively permit or prevent or at least hinder the taking of digital impressions by the lens or lenses that those shutters overlie. It is contemplated that in some embodiments the case 10 may have only one shutter that is selectively caused to toggle between the first and second conditions so as to respectively permit or hinder the taking of digital impressions by either the front camera lens 56 or the rear camera lens 67. In embodiments of that type, the other of the front or rear camera lens 56, 67 may be permanently blocked respectively by a wall such as the top front section 20 or the top section 66 of the back wall 40 of the case 10, or by some other structure. It is contemplated that each of the first and second shutters 77, 79 may form part or otherwise be associated with one or more of the walls of case 10, so long as they are effective in selectively hindering or leaving unobstructed the taking of digital impressions with the associated camera lens.

In the non-limiting example embodiment of FIGS. 1, 1A, 2A-2C, 3, and 4, each of the first and second shutters 77, 79 is in the form of a dispersion film 84a, 84b, such as a polymer dispersed liquid crystal film available from Liquid Crystal Technologies of Cleveland, Ohio. The dispersion film 84a, 84b in that embodiment has a clear state, allowing the passage of light there through, and an opaque state that blocks or at least hinders the passage of light. The state of the dispersion film 84a, 84b is controlled by an electronic circuit 86 of the case 10, that includes a power source such as a battery 88, a controller 89 that includes a Bluetooth® board 90, an AC-DC converter 91 that feeds power to the dispersion film 84a, 84b, and a solid-state relay 92 that serves to relay power from the battery 88 to the converter 91. As used throughout this document, the term "controller" is intended to denote a combination of electronic elements configured to carry out a specific set of commands and which may include or otherwise be in the form of a processor (e.g., a small onboard logic chip), or alternatively include or otherwise be in the form of an electronic switch that is configured to received data from a phone, computer, or another source. In the illustrated embodiment, the default state of the dispersion film 84a, 84b is opaque, with power selectively received by the dispersion film 84a, 84b being effective to change the state to clear.

Alternative embodiments are contemplated, however, in which the default state of the dispersion film 84a, 84b is clear, with power selectively received by the dispersion film 84a, 84b being effective to change the state to opaque. As shown in FIG. 3, the example case 10 in that figure has a first dispersion film 84a located between the top front section 20 and the front surface 14 of the mobile phone 12, and disposed so as to overlie the front camera lens 56. A second dispersion film 84b is located between the rear surface of the mobile phone 12 and a base wall or base cover 93 of case 10. The second dispersion film 84b overlies the rear camera lens 70. While not shown, the example case 10 may include an O-ring or similar structure along the perimeter of the opening 71, effective to prevent the travel of light, when the flash is triggered to take a digital impression, from LED light 68 along the surface of the dispersion film 84b.

The selective toggling or switching of the shutter or shutters 77, 79 between the first and second conditions is controlled by an application (or "APP") installed on the mobile phone 12 enveloped by the case 10, and which controls operation of the controller 89 of the case 10. The controller 89 is operatively coupled to the one or more shutters 77, 79 of the case 10 defined, in the illustrated embodiment, by the pair of dispersion films 84a, 84b. More specifically, the installed APP directs operation of the controller 89 of the case 10 such that toggling of a shutter 77, 79 into the first condition—and thereby the taking of a digital impression—is permitted only if a specific set of conditions is met. For example, the controller 89, as instructed by the APP, may first verify that the electronic circuit 86 of the case 10 is closed, which may only be true—in one example—if the first and second hingedly coupled portions 24, 26 of the example case 10 are fully engaged with one another so as to securely envelop the mobile phone 12.

In the illustrated embodiment, the controller 89 verifies through the APP that the electronic circuit 86 is closed by determining whether or not a limit switch 94 of case 10 has been depressed by placing of the phone 12 in the interior volume 28 of case 10. More specifically, and as shown in FIGS. 2A-2C, the limit switch 94 has a switch pin 95 that protrudes through an aperture 96 of base cover 93. The presence of the mobile phone 12 in the interior volume 28 of case 10 is effective to depress and thereby actuate limit switch 94. Removal of phone 12 from interior volume 28 causes the switch pin 95 to return to its original position, corresponding to an unactuated state of limit switch 94. Actuation of the limit switch 94 closes the electronic circuit 86. Additionally or alternatively, the controller 89 may verify, as instructed by the APP, that the mobile phone user's profile and/or a unique identifier (e.g., number) of the mobile phone 12 enveloped by the case 10 against a database containing a list of authorized users and/or authorized mobile phones 12. Once such verification is completed, the APP may direct the controller 89 to allow current to flow to the one or more dispersion films 84a, 84b. In alternative embodiments, for example those in which the default state of a dispersion film 84a, 84b is clear, rather than opaque, upon completing verification the APP may direct the controller 89 to cease the feeding of current to that dispersion film, thereby allowing the unobstructed, unhindered taking of digital impressions with the camera lens that the dispersion film overlies.

In the illustrated embodiment, the flow of current to the one or more dispersion films 84a, 84b, in turn, is effective to cause the one or more dispersion films 84a, 84b to attain the first condition. Conversely, the absence of power in a dispersion film 84*a*, 84*b* causes that dispersion film 84*a*, 84*b* to remain in the second condition i.e., in which no light flows through that dispersion film 84*a*, 84*b*. The inability of light to freely flow through the dispersion film 84*a*, 84*b*, in turn, is effective to yield digital impressions—such as photographs or video—taken with the camera lens behind that dispersion film 84*a*, 84*b*, that are opaque, blurry, or of general low quality relative to digital impressions taken when light is allowed to freely flow the dispersion film(s) 84*a*, 84*b*. Case 10 also includes a power jack 99 that is used to recharge battery 88 of the electronic circuit 86.

In certain embodiments (not shown), the case 10 may include a male connector in the bottom portion 26 of case 10, and that is configured for insertion into a cooperating jack or data port (e.g., mini-USB data port, micro-USB data port) of the mobile phone 12. In those embodiments, the controller may, as instructed by the APP, verify that the male connector is fully inserted into the cooperating jack or data port of the mobile phone 12 and in full contact with the mobile phone's circuitry so as to detect active use of the phone 12. The male connector in those embodiments is operatively coupled to the controller 89. Contacting engagement between the male connector of the case 10 and the mobile phone's circuitry may also be a condition for selectively allowing the shutter(s) 77, 79 to toggle to the first condition, thereby allowing the unhindered taking of digital impressions by one or both of the camera lenses 56, 67.

If any of the above-discussed example conditions is not met, the APP would not permit the one or more shutters to toggle to the first condition, thereby preventing the taking of digital impressions by one or both of the camera lenses 56, 67 of the mobile phone 12. Specifically, in the illustrated embodiment that uses a dispersion film 84*a*, 84*b* for shutters 77, 79, if all required conditions are met, the APP directs the controller 89 to allow power to be fed to the dispersion film 84*a*, 84*b*, thereby changing the state of the film 84*a*, 84*b* from opaque to clear, which in turns allows the taking of digital impressions by one or both of the camera lenses 56, 67.

With continued reference to FIGS. 1, 1A, 2A-2C, 3, and 4, and further referring to FIG. 5, the case 10 may be operatively coupled, through a wireless communication element, such as a WiFi-type connection or a Bluetooth® connection, to a server 100 or some other computer in the controlled environment 11, thereby allowing the case 10 to be networked with that server 100 or computer. Embodiments are also contemplated in which the case 10 is also operatively coupled to the phone 12 through a wireless communication element of the type described above. In the illustrated embodiment, case 10 is operatively coupled to server 100 through the Bluetooth® board 90 that is operatively coupled to controller 89 and which forms part of the electronic circuit 86.

The server 100 automatically saves original copies of all digital impressions taken by the mobile phone 12 from within the APP. In that regard, it is understood that only the installed APP has the capability of selectively allowing toggling of the shutter(s) 77, 79, such that the mobile phone's pre-installed "camera" application(s) would not have the capability of taking digital impressions with a mobile phone's camera when the shutter overlying that camera is in the second condition (e.g., when the dispersion film 84*a*, 84*b*, if used for that shutter, is an opaque state). In operation, a user of the mobile phone 12 may be able to retrieve copies of the digital impressions taken by the mobile phone 12, only after those digital impressions have been reviewed and authorized for release by personnel controlling or otherwise accessing the server 100 or other external computer in communication with case 10 and/or phone 12. Server 100 or some other computer external to the case 10 and phone 12 may optionally be located remotely from controlled environment 11, as shown in phantom lines in FIG. 5. If located remotely, the server 100 or computer may be configured to communicate with case 10 and/or with phone 12 via a wireless type of connection, such as Bluetooth® or WiFi.

As discussed above and illustrated particularly in FIGS. 3 and 4, case 10 includes a power source in the form of a battery 88, that provides power to the electronic circuit 86. While not shown, it is contemplated that the battery 88 may serve as a back-up power source for the mobile phone 12 itself, with power flowing from the battery 88 to the mobile phone's battery and/or other components of the mobile phone's electronic circuit through the connection between the optional male connector discussed above (not shown) of the case 10 and the mobile phone's jack or data port. Alternative embodiments are contemplated in which the case 10 does not include a dedicated power source, such as battery 88, but instead obtains power for the controller 89 and other components of the electronic circuit 86 from the mobile phone's battery. In embodiments of that type, a physical connection may be required between the mobile phone 12 and the case 10, such as the example connection described above provided by insertion of the optional male connector of the case 10 and the jack or data port of the mobile phone 12.

The materials, dimensions and overall appearance of the case 10 are suitably chosen to fit particular types of mobile phones, tablets, or other portable communication and/or storage devices. Alternatively, the case 10 may be designed to envelop two or more different types of such devices. In the embodiment shown in FIGS. 1, 1A, 2A-2C, and 3, the case 10 is made to tightly envelop an example Apple iPhone® 6, although the case 10 may alternatively be made to tightly envelop other types of phones, tablets or other devices. The color of the case 10, in particular embodiments, is chosen so as to promote compliance e.g., use of an authorized case 10 enveloping a mobile phone 12 or tablet in the controlled environment 11. More specifically, color, logos, and/or other aesthetic features of the case 10 may be chosen so as to attract attention and/or to facilitate easy identification of the case 10, so that it would be relatively easy to detect a person impermissibly using a mobile phone 12 that is not enveloped by a case 10 authorized in the controlled environment 11. In that regard, security or other type of compliance personnel in the controlled environment 11 could be easily made aware of the unauthorized use of a mobile phone 12 such that appropriate measures may be taken, such as removal of the user of that mobile phone 12 from the controlled environment 11 or even confiscation of the mobile phone 12. The color of the entire case 10 or portions of the case 10 could for example, and without limitation, be a bright and/or fluorescent color.

In use, removal of the mobile phone from the case results in an open compliance circuit, which is effective to toggle the one or more shutters 77, 79 of case 10 to the second condition (i.e., in which the taking of digital impressions is hindered) and is further effective to notify the server 100 (or other element of the network of which server 100 forms part) that the mobile phone 12 is no longer compliant. In that regard, the one or more shutters 77, 79 of the case 10 remain in the second condition unless the case 10 is connected to a mobile phone 12 enveloped by the case 10, and so long as the APP is installed on the mobile phone 12 and used to take digital impressions. The embodiments described herein and contemplated variations of those embodiments are accordingly effective to prevent the use of portable communication and/or storage devices in a controlled environment, and are further effective to prevent those devices from taking digital impressions unless specific conditions are met e.g., the device is properly enveloped and/or connected to an authorized case 10, the APP is installed on the device, and all digital impressions in the controlled environment are taken by the device from within the APP. It is understood that while the embodiments illustrated in the figure and described in connection with that figure disclose a case 10 configured for use with a mobile phone 12, the same principles of operation and structural details may be similarly applicable to cases configured for use with tablets or other types of portable communication and/or storage devices, with those other embodiments being contemplated to fall within the scope of the present disclosure.

It is contemplated that the mobile phone 12 itself may be networked with the server 100 to ensure compliance, applying "geofencing" principles. Specifically, the mobile phone 12 may be connected wirelessly to the server 100 whenever they are in close proximity of one another, such as within the controlled environment 11. For example, the APP installed on the mobile phone 12 may be such that same runs in the background of the mobile phone 12 at all times, and may include a set of instructions that automatically connects the mobile phone 12 to the server 100 whenever the server 100 or the mobile phone 12 itself detects that the mobile phone 12 is within a predetermined distance from the server 100 and/or within the controlled environment 11. Likewise, the set of instructions generated by the APP to controller 89 may automatically disconnect the mobile phone 12 from the server 100 when the server 100 or the mobile phone 12 itself detects that the mobile phone 12 is outside of or beyond the controlled environment 11. To that end, the case 10 may further include, for example and without limitation, a GPS-chip and/or an RFID chip (not shown).

Automatic connection between the mobile phone 12 and the server 100 or other external computer may cause a signal to be generated by the server 100 or other computer or by the mobile phone 12, associated with detection of the phone 12 within the controlled environment 11 but non-compliance with the rule that the phone 12 must be enveloped by an authorized case 10. That generated signal may then permit appropriate measures to be taken by security or other personnel in or around the controlled environment 11, such as removal of the non-compliant user of the mobile phone 12 from the controlled environment 11 or even confiscation of the mobile phone 12. It is also contemplated, in that regard, that the case 10 or the mobile phone 12 itself may generate a signal to the server 100, or even sound a local alarm (not shown) forming part of the electronics of the case 10 or mobile phone 12, associated with a condition of compliance e.g., wherein the case 10 and the mobile phone 12 are securely connected to one another in the intended manner.

Referring now to FIGS. 6, 7A, and 7B, those figures show another example embodiment of a privacy system including an apparatus 110 that partially envelops or encases a portable communication or storage device in the form of a mobile phone 12. For ease of understanding, like reference numerals in FIGS. 6, 7A, and 7B refer to similar features in the preceding figures, the description of which may be referred to for an understanding of the structure, variations, and functionality of the features of the embodiment of FIGS. 6, 7A, and 7B. Apparatus 110 includes a main compartment 112 that houses various electronic components such as those shown and described above in connection with the features of case 10 (FIGS. 3 and 4). Like the example case 10 of the preceding figures, apparatus 110 includes a plurality of walls that define an encasement configured to at least partially enclose mobile phone 12. In the example embodiment illustrated in the figures, apparatus 110 includes a pair of walls 116, 118 that are naturally urged toward one another. When the top of phone 12 is inserted between walls 116, 118, the walls 116, 118 are forced apart, and the walls in response exert a holding force against the phone 12 that is effective to frictionally secure the apparatus 110 in place relative to phone 12. Alternative embodiments are contemplated in which the apparatus 110 is secured in place relative to phone 12 through other means that may or may not rely on friction.

Walls 116, 118 of apparatus 110 include respective shutters 77, 79 having a structure and functionality similar to the like-numbered shutters of the example case 10 in the preceding figures. While not shown, apparatus 110 may include a device such as a sensor or switch, that allows one or more of the electronic components housed in main compartment 112 to detect that the phone 12 is secured in place against the walls 116, 118. For example, apparatus 110 may include a limit switch similar in structure and functionality to the limit switch 94 of case 10 of the preceding embodiments. The materials making up walls 116, 118 may be rigid, such as a rigid plastic material, or may alternatively be a non-rigid, flexible material. The materials making up main compartment 112 may be the same as those making up walls 116, 118, or may be different.

Figure 8C:
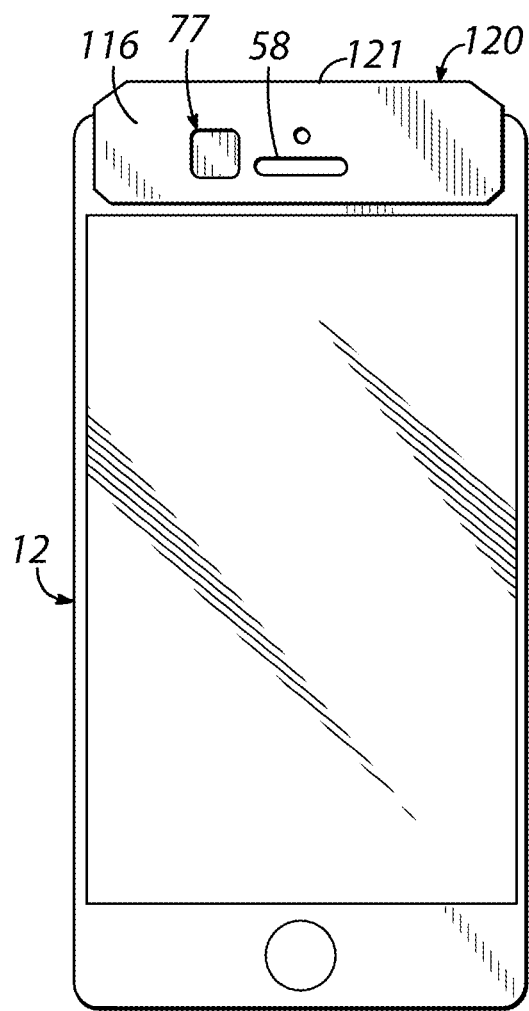
FIG. 8C is a front elevation view of the apparatus of FIGS. 8A and 8B.

Referring now to FIGS. 8A, 8B, and 8C, another embodiment is shown of a privacy system including an apparatus 120 that at least partially encases or envelops a portable communication and/or storage device in the form of a mobile phone 12. For ease of understanding, like reference numerals in FIGS. 8A-8C refer to similar features in the preceding figures, the description of which may be referred to for an understanding of the features in this embodiment as well. Apparatus 120 is similar to apparatus 110 (FIGS. 6, 7A, and 7B) and is made up of a pair of sections 121, 122 that are slidably coupled to one another to permit selective movement of sections 121, 122 relative to one another, thereby making apparatus 120 extendable. For ease of explanation, section 121 will be referred to in this description as "top section" 121, and section 122 will be referred to as "bottom section" 122, understanding that "top" and "bottom" are not intended as limiting adjectives but rather merely refer to the orientation of the apparatus 120 as shown in FIGS. 8A-8C.

Apparatus 120 includes a controller 89 (schematically shown) as well as other electronic components—such as those described in connection with FIGS. 3 and 4—that are housed in the interior of bottom section 122. It is contemplated that, alternatively, controller 89 and/or other electronic components may instead be located in the interior of top section 121. Controller 89 is operatively coupled to one or more shutters 77, 79, located in top section 121, that have a structure and functionality similar to the like-numbered shutters in the preceding embodiments. The top and bottom sections 121. 122 in the illustrated embodiment are slidably coupled to one another through a common inner shaft 123 that is permanently connected to and moves with top section 121 and that is received along a channel 124 of bottom section 122. Alternative embodiments are contemplated permitting slidable movement of sections 121, 122 relative to one another but having a different type of structure. In one contemplated variation, for example (not shown), the inner shaft 123 is permanently connected to bottom section 122 and is received along a channel of top section 121. Movement of sections 121, 122 relative to one another allows extendable apparatus 120 to accommodate mobile phones 12 of different lengths.

Figure 9A:
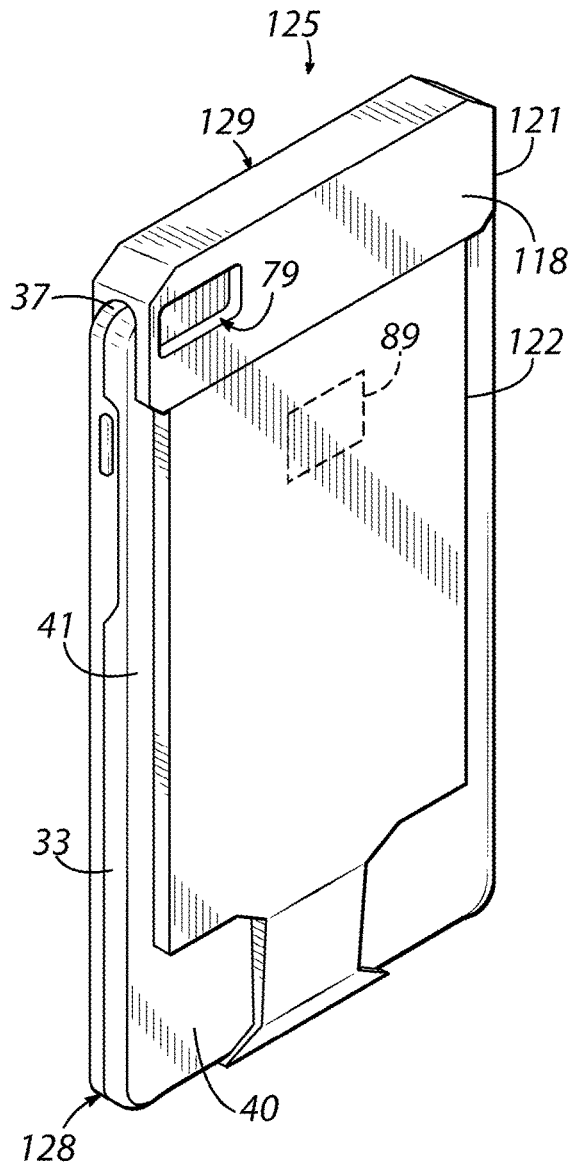
FIG. 9A is a rear perspective view of a privacy system including an apparatus at least partially enveloping a portable communication or storage device, in accordance with another embodiment of the invention.
Figure 9B:
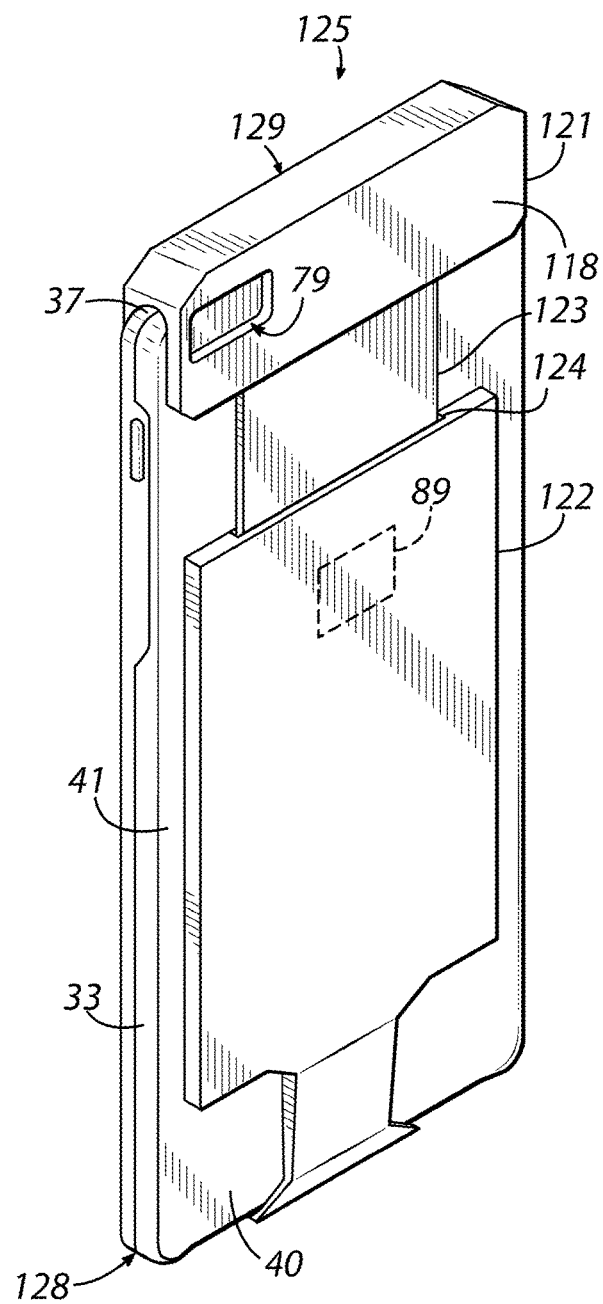
FIG. 9B is a view similar to FIG. 9A, illustrating an extendable portion of the apparatus therein in an extended condition.
Figure 9C:
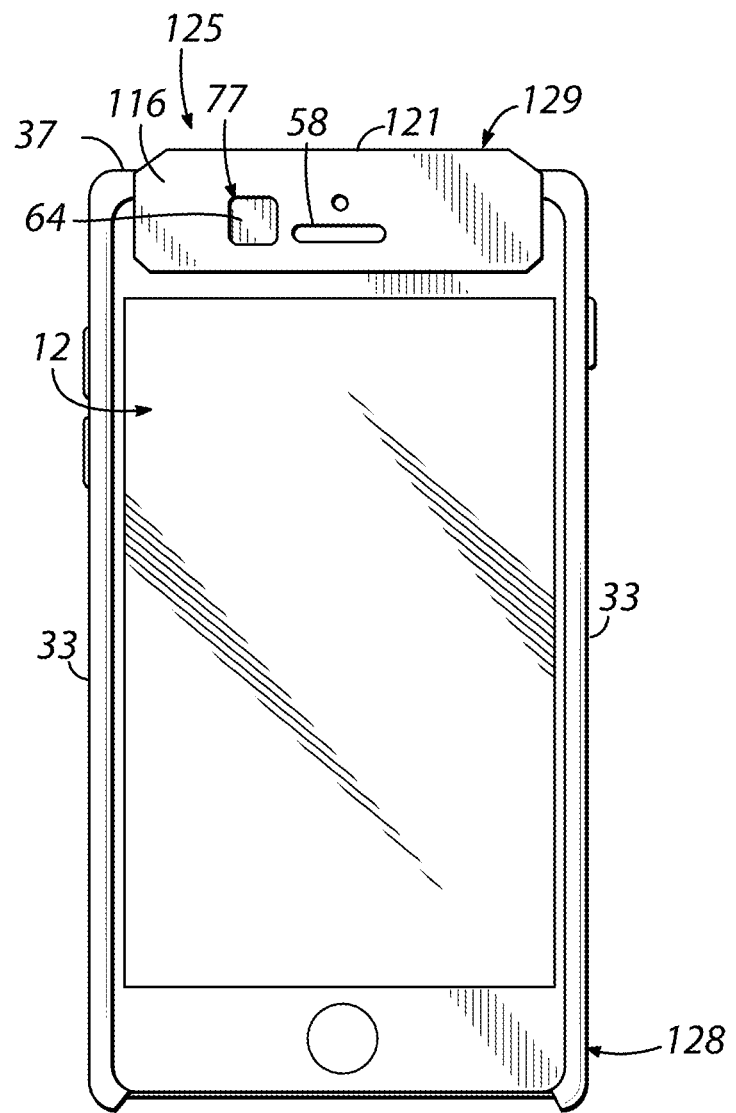
FIG. 9C is a front elevation view of the apparatus of FIGS. 9A and 9B.

With reference to FIGS. 9A, 9B, and 9C, another embodiment is shown of a privacy system including an apparatus 125 that at least partially encases or envelops a portable communication and/or storage device in the form of a mobile phone 12. For ease of understanding, like reference numerals in FIGS. 9A-9C refer to similar features in the preceding figures, the description of which may be referred to for an understanding of the features in this embodiment as well. The apparatus 125 includes an encasement part 128 made up of a plurality of walls 33, 37, 40, 41 and an extendable part 129 coupled to encasement part 128. Encasement part 128 may be sized and shaped so as to accommodate a specific model of mobile phone 12 or other type of portable communication and/or storage device. Extendable part 129 is similar in structure and functionality to apparatus 120 and includes, in that regard, a pair of sections 121, 122 also similar to the like-numbered sections of the embodiment of FIGS. 8A-8C.

As in the embodiment of FIGS. 8A-8C, movement of sections 121, 122 of apparatus 125 in FIGS. 9A-9C relative to one another allows extendable part 129 to accommodate mobile phones 12 of different lengths. This may be desirable in order to minimize the inventory of parts making up apparatus 125 in manufacturing. Specifically, and by way of example, a manufacturer of apparatus of this type may wish to have an interchangeable part—such as extendable part 129—that may be selectively coupled to one of a plurality of available encasement parts 128 that are respectively designed for specific models of portable communication and/or storage devices (e.g., mobile phone 12). To that end, coupling between parts 128, 129 may be of the releasable type—such as a snap/pressure fit or through screws or other fasteners, which may be advantageous to facilitate quick coupling between those parts 128, 129. Alternatively, coupling between parts 128, 129 may be of the permanent type—such as with an adhesive element or by molding both parts together, which may be desirable to prevent separation of parts 128, 129 by end users.

The presence of an encasement part 128 in the embodiment of FIGS. 9A-9C (i.e., vs. the embodiment of FIGS. 8A-8C) may be desirable—for example—in order to enhance the grip of the mobile phone 12 by the user of that phone 12. On the other hand, the embodiment of FIGS. 8A-8C requires fewer parts and would be less costly to manufacture than the embodiment illustrated in FIGS. 9A-9C.

Figure 10A:
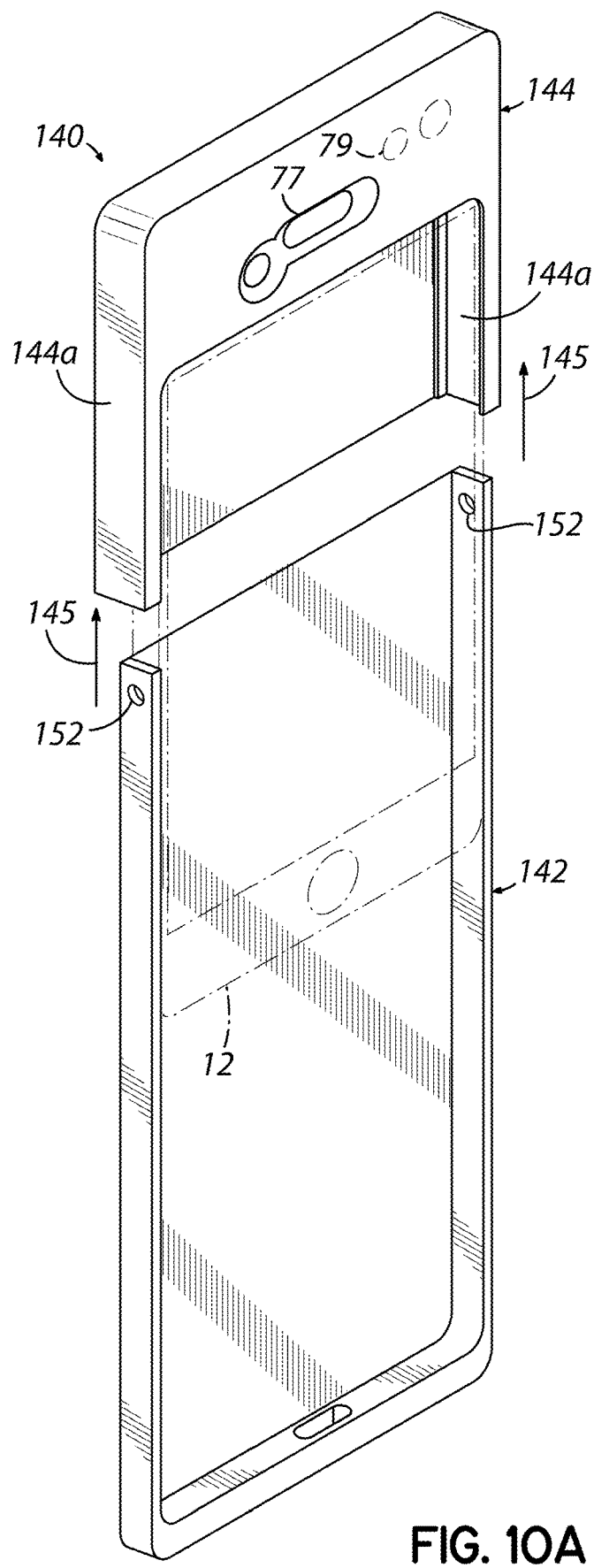
FIG. 10A is a schematic, perspective view of an apparatus for at least partially enveloping a portable communication or storage device in accordance with yet another embodiment of the invention.
Figures 10B, 10C:
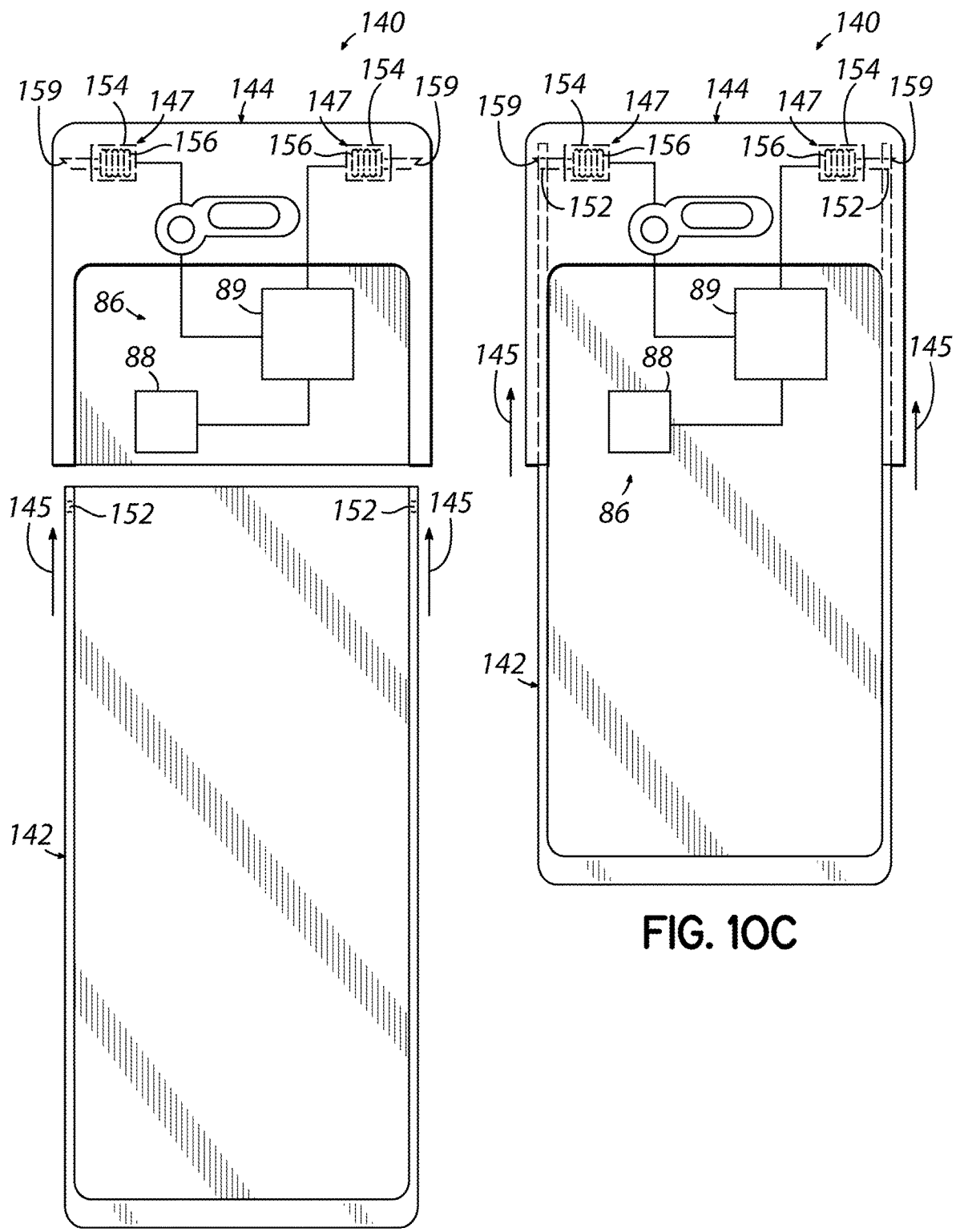
FIG. 10B is a schematic, elevation view of the apparatus of FIG. 10A showing encasement portions thereof in a disassembled condition.
FIG. 10C is a view similar to FIG. 10B showing the encasement portions thereof in an assembled condition.

With reference to FIGS. 10A, 10B, and 10C, in which like reference numerals refer to similar features in the previously discussed embodiments, an embodiment is shown of an apparatus 140 that, like other embodiments described herein, at least partially encases or envelops a portable communication and/or storage device in the form a mobile phone 12 (FIG. 10A). It is contemplated that the features of apparatus 140 illustrated and described herein may be combined with any of the features of the embodiments of the preceding figures or variations thereof. Apparatus 140 includes a plurality of walls that define an encasement configured to enclose or envelop mobile phone 12. In the illustrated embodiment, the encasement is made up of two encasement portions 142, 144 that are slidable relative to one another. FIGS. 10A and 10B, in particular, show encasement portions 142, 144 while separated from one another. Sliding movement of encasement portions 142, 144 relative to one another, as suggested by arrows 145, is effective to slidably move side walls 142a of the encasement portion 142 within the space defined between side walls 144a of encasement portion 144. Slidable movement of encasement portions 142, 144 with respect to one another includes a position, shown in FIG. 10C, in which a lock 147 of apparatus 140 is automatically or manually toggled into a locked state, as more fully explained below.

As stated above, apparatus 140 includes a lock 147 that may be automatically or manually toggled into a locked state (FIG. 10C). In the locked state, lock 147 prevents, or at least hinders, separation of encasement portions 142, 144 from the mobile phone 12. As used herein, the term "hinders" when referring to the locked state of lock 147 refers to a state in which separation (e.g., removal) of mobile phone 12 from apparatus 140 would require a tool, such as a prying tool or a screwdriver, or which would require destruction of the mobile phone 12 or any part of apparatus 140. In the non-limiting example embodiment of FIGS. 10A-10C, lock 147 includes a pair of locking pins 150 that, in the locked state of lock 147, are received within respective apertures 152 disposed on side walls 142a. In the illustrated embodiment, the locking pins 150 are operatively coupled to a controller 89 of apparatus 140, and which forms part of an electronic circuit that may be similar in components and function to electronic circuit 86 (FIG. 4) and further include, for example, a battery 88. Other components of circuit 86 are not shown in FIGS. 10A-10C for the sake of simplicity of explanation and ease of understanding.

The locking pins 150 in this example embodiment are operatively coupled to controller 89 through a pair of respective solenoids 154 that are also operatively coupled to controller 89 as well as to battery 88. Selective energizing of the solenoids 154 is effective to toggle the locking pins 150 into/through the apertures 152, to thereby attain the locked state of lock 147, or inward and away from apertures 152 to attain the unlocked state. In one specific embodiment, energizing and deenergizing of solenoids 154 respectively correspond to the locked and unlocked states of lock 147. In another specific embodiment, energizing and deenergizing of solenoids 154 respectively correspond to the opposite, namely the unlocked and locked states of lock 147. In those embodiments, controller 89 verifies that one or more predetermined conditions are met before allowing the lock 147 to toggle from the locked state to the unlocked state. Further, controller 89 may also be configured to verify that one or more predetermined conditions are met before allowing lock 147 to toggle from the unlocked state to the locked state.

In yet another specific embodiment, energizing solenoids 154 may be solely configured to toggle lock 147 from the locked state to the unlocked state, while toggling from the unlocked to the locked state occurs automatically. More specifically, and as illustrated in FIGS. 10B and 10C, the lock 147 may include a pair of biasing elements in the form—in that example embodiment—of springs 156 that urge locking pins 150 toward the locked state i.e., outward in the illustrated embodiment. Upon slidable movement of encasement portions 142, 144 relative to one another, the side walls 142a engage and push the locking pins inward until the apertures 152 line up with the locking pins 150, to thereby allow locking pins 150 to be received within/through apertures 152. To that end, in this example embodiment, the locking pins 150 have respective beveled tips 159 that facilitate initial engagement and inward displacement of the locking pins 150 during sliding movement of side walls 142a relative to side walls 144a. In this embodiment, controller 89 verifies that one or more predetermined conditions are met before energizing solenoids 154 to thereby allow the lock 147 to toggle from the locked state to the unlocked state. More specifically, energizing of the solenoids 154 is effective to retract the locking pins inward, away from apertures 152.

As stated above, controller 89 is configured to verify that one or more conditions are met before allowing the lock 147 to toggle between the locked and unlocked state. This feature prevents the mobile phone 12 user from unilaterally removing the mobile phone 12 from the apparatus 140 when the mobile phone 12 is in a controlled environment, such as a hospital or school, for example. In some embodiments, the controller 89 verifies that an instruction by a user to unlock the apparatus 140 (i.e., to toggle the lock 147 from the locked state to the unlocked state) is being provided through an application installed on mobile phone 12 before allowing the apparatus 140 to be unlocked. Alternatively or additionally, the controller 89 may verify that the apparatus 140 is within a predetermined distance of an external server or computer, and/or may verify that the apparatus 140 is within or outside a predetermined area before allowing the apparatus 140 to be unlocked. For example, the controller 89 may determine through geofencing that the apparatus 140 is located in a cafeteria of a hospital, in which privacy may not be expected, thereby allowing the apparatus 140 to be unlocked, while not allowing such action when determining that apparatus 140 is within a restricted area in which privacy would be expected.

Another condition that controller 89 may be configured to verify is whether the mobile phone 12 is properly encased by apparatus 140 or that communication of apparatus 140 and/or mobile phone 12 with an external server or computer has been established e.g., through a Bluetooth® or Wifi connection.

Embodiments are similarly contemplated in which upon the user of a mobile phone 12 entering a predetermined area of a controlled environment, the apparatus 140 automatically toggles lock 147 from the unlocked state to the locked state. This would occur when, through geofencing for example, the controller 89 determines that the apparatus 140 and/or the encased mobile phone 12 is/are located in a restricted area and, in response directs the lock 147 to toggle to the locked state. Other embodiments are also contemplated in which toggling to the locked state occurs automatically when an external server or computer (which may include an external mobile phone) sends a signal to apparatus 140 to toggle the lock 147 to the locked state upon entering a restricted area. For example, upon entering a restricted area, and through geofencing or other methods, apparatus 140 and/or the encased mobile phone 12 may send a signal to such external server or computer with which it is in communication, and the server or computer may respond by sending a signal to apparatus 140 to toggle lock 147 to the locked state.

Alternatively, personnel responsible for the controlled environment may manually send a signal to apparatus 140, from a remote server or computer, to toggle lock 147 to the locked state, when for example the mobile phone 12 encased by apparatus 140 has been observed to enter a restricted area. Personnel may, in specific embodiments, manually enter an instruction for apparatus 140 to toggle lock 147 to the locked state, with such instruction being provided through an application installed in mobile phone 12. Similarly, it is contemplated that personnel may be able to enter an instruction for apparatus 140 to toggle to the unlocked state, with controller 89 verifying that such instructions are provided through the APP. Instructions entered through such APP may include the entering of a password or secret code only known to authorized personnel, and with controller 89 being configured to verify that the so entered password or secret code matches an authorized password or secret code.

While the lock 147 in the embodiment of FIGS. 10A-10C is in the form of a locking pin 150 whose motion is controlled by a solenoid 154, it is contemplated that the lock 147 may alternatively take other forms or include fewer or additional components relative to those shown in the figures. For example, and without limitation, an alternative lock could include magnetic elements that are selectively energized and deenergized by the controller 89 to toggle the lock 147 into a locked state or unlocked state. Similarly, it is contemplated that one or more of the walls defining the encasement portions 142, 144 may be made of a suitably chosen material to further hinder removal of the mobile phone 12 from the apparatus 140. For example, one or more of the walls may be made of a hard plastic material such as an ABS thermoplastic polymer, which would be hard to flex in order to remove the mobile phone 12 from apparatus 140. It is contemplated that apparatus 140 may use a controller 89 in the form of a processor, or alternatively use a simple type of controller in the form of an electronic switch that is configured to receive data from the mobile phone 12 or from another source. A simple electronic switch may be desirable in order to minimize the complexity of construction and operation of such apparatus.

As stated above, the locking feature described above in connection with the illustrative embodiment of FIGS. 10A-10C may be combined with any of the structures, features, and/or functionalities described in connection with the preceding figures. In that regard, for example, a user of the mobile phone 12 within a controlled environment may be prevented from taking unauthorized digital impressions (e.g., photos) in the controlled environment so long as the mobile phone 12 is encased within apparatus 140. And the locking feature prevents the user from unilaterally removing the mobile phone 12 from the apparatus 140 unless permitted to do so. It is contemplated, notwithstanding, that the example locking feature 147 or variations thereof may be utilized in a different apparatus for at least partially enveloping a mobile phone 12, and which does not have shutters for selectively permitting or preventing the taking of digital impressions within a controlled environment. For example, and without limitation, the locking feature 147 and variations thereof may be used in an encasing apparatus that completely blocks the camera lens(es) of the mobile phone 12, therefore not permitting the taking of digital impressions under any conditions whatsoever. Such an alternative embodiment may take the structural form of any of the embodiments illustrated and/or described throughout the present disclosure, but obviate the shutters forming part of those embodiments.

Figure 11A:
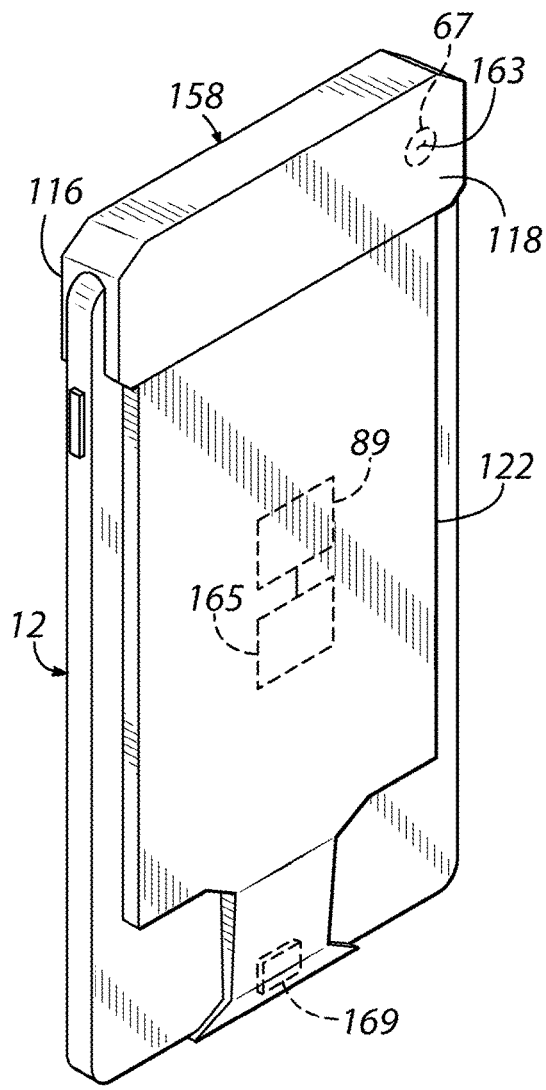
FIG. 11A is a perspective view of a privacy system including an apparatus that at least partially envelops a portable communication or storage device, in accordance with another embodiment of the invention.
Figure 11B:
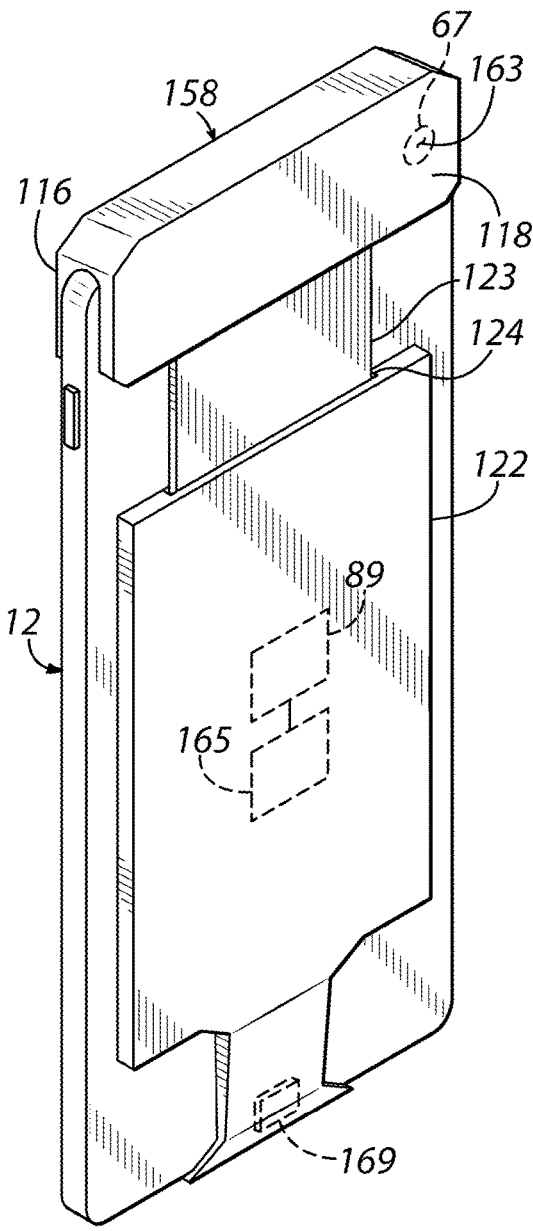
FIG. 11B is a view similar to FIG. 11A, illustrating an extendable portion of the apparatus therein in an extended condition.
Figure 11C:
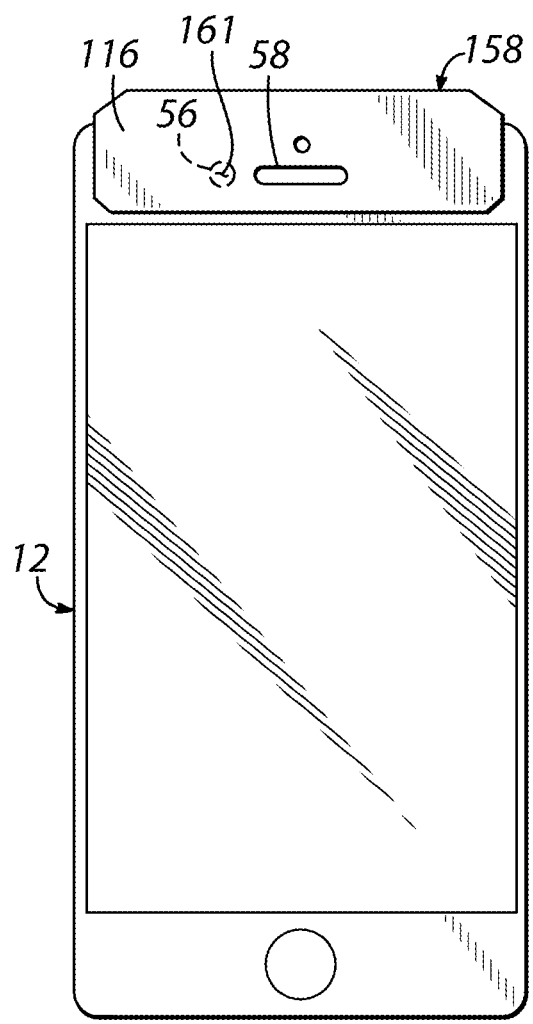
FIG. 11C is a front elevation view of the privacy system of FIGS. 11A and 11B.
Figure 12A:
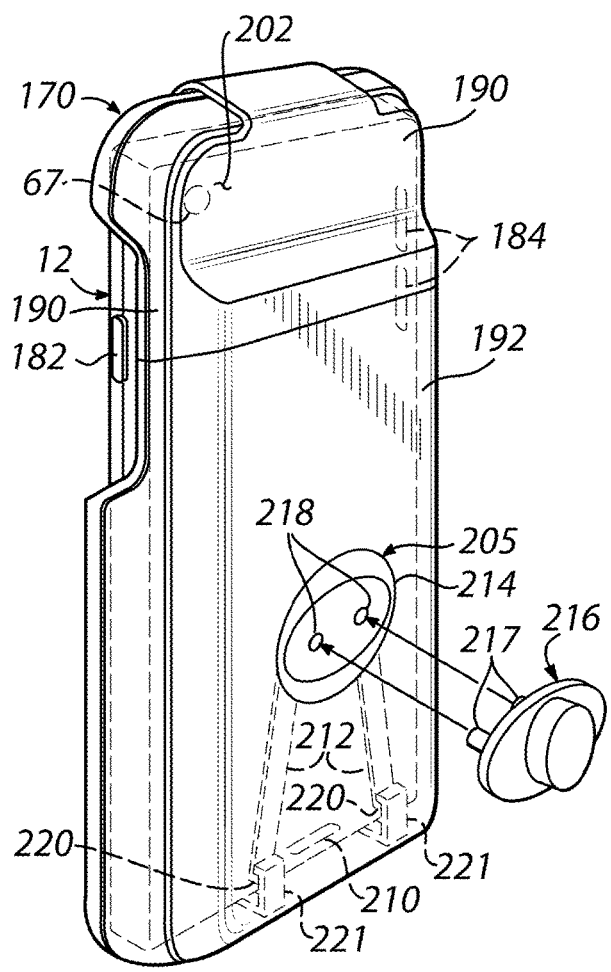
FIG. 12A is a rear perspective view of a privacy system including an apparatus for at least partially enveloping a portable communication or storage device, in accordance with yet another embodiment of the invention.
Figure 12B:
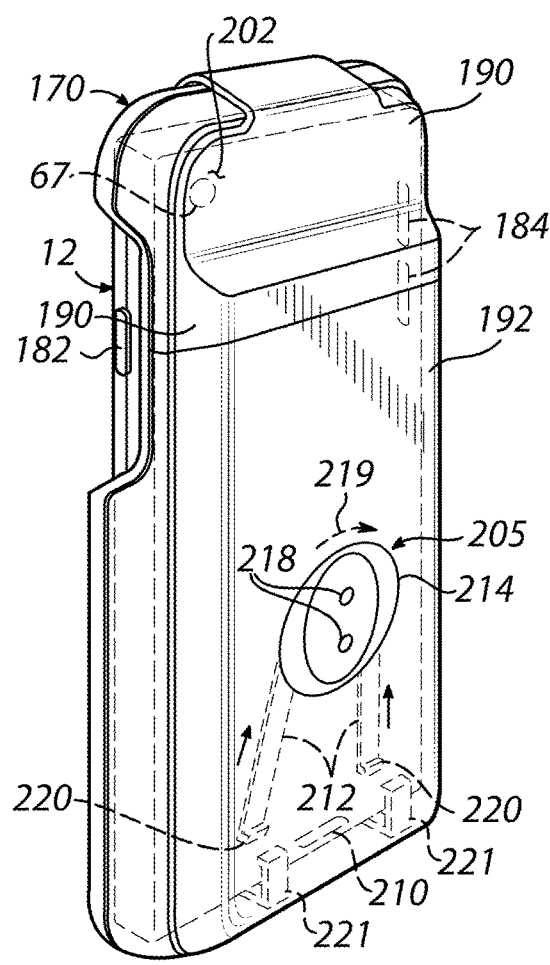
FIG. 12B is a view similar to FIG. 12A, schematically showing operation of a lock of the apparatus.

An example of an embodiment that does not permit the taking of digital impressions under any conditions is provided in FIGS. 11A, 11B, and 11C. Those figures illustrate a privacy system including an encasing apparatus 158 that, as is the case with the preceding embodiments, is configured to at least partially envelop a portable communication or storage device, such as a mobile phone 12. Like reference in FIGS. 11A-11C refer to similar features in the preceding figures, the description of which may be referred-to for an understanding of the structure and functionality of those features in the illustrative embodiments of FIGS. 11A-11C as well. The embodiments of FIGS. 11A-11C have spaced apart wall portions 161, 163 that overlie corresponding front and rear camera lenses 56, 67 (FIG. 3) of mobile phone 12. Unlike the embodiments in some of the preceding figures, wall portions 161, 163 are configured to permanently hinder the taking of digital impressions with camera lenses 56, 67, so long as mobile phone 12 is encased by apparatus 158. In that regard, wall portions 161, 163 are free of shutters or similar elements that would selectively open or otherwise change condition to permit the taking of digital impressions with those camera lenses 56, 67.

Wall portions 161, 163 are made of a material or combination of materials that hinders the taking of such digital impressions. In that regard, they may be made, for example, of an opaque material that may be the same as the remainder of the walls 116, 118 that respectively include those wall portions 161, 163. An advantage of having shutter-free wall portions 161, 163 that are made of the same material of which walls 116, 118 are made is that they provide for simplified manufacturing relative to walls 116, 118 that include shutters, such as in the embodiments of FIGS. 8A-8C, for example. Further, the absence of shutters in wall portions 161, 163 simplifies operation of apparatus 158 (i.e., there are fewer components for controller 89 to control) relative to other embodiments that include shutters. Notably, however, the absence of shutters in wall portions 161, 163 removes the ability to selectively allow the taking of digital impressions with the camera lenses 56, 67 overlay by those wall portions.

With continued reference to FIGS. 11A-11C, the illustrative apparatus 158 also has a proximity detector 165 that is operatively coupled with controller 89 and thereby forms part of electronic circuit 86 (FIG. 4). Proximity detector 165 may be located on an exposed surface of one of the walls of apparatus 158, or may alternatively be disposed in an interior volume within apparatus 158, such as an interior volume that also houses other electronic components of apparatus 158, such as controller 89 and battery 88 (FIG. 4). Proximity detector 165 is configured to detect whether mobile phone 12 is within a predetermined (i.e., threshold) distance from proximity detector 165 (or other part of apparatus 158), with that predetermined distance being indicative of the expected distance when the mobile phone 12 is securely enveloped by apparatus 158. In operation, if proximity detector 165 senses or otherwise detects that the distance between detector 165 (or other part of apparatus 158) and mobile phone 12 is greater than the threshold distance, controller 89, upon determining that the detected distance is greater than the threshold distance, in response generates a signal to a remote server, such as the server 100 (FIG. 5) described in connection with the embodiments associated with preceding figures. The generated signal effectively works as an alarm that alerts personnel in charge of controlled environment 11 to the fact that apparatus 158 has been impermissibly separated from mobile phone 12 (i.e., mobile phone 12 has been removed from apparatus 158). Additionally, at least some of the exterior surface(s) of the apparatus 158 may be of a bright (e.g., fluorescent) color or include some other highly and easily distinguishable feature to allow easy visual detection of an apparatus 158 being in the controlled environment 11 without a mobile phone 12 encased by that apparatus 158.

Additionally, in operation, the proximity detector 165 may detect that the threshold distance requirement has been met—indicative of mobile phone 12 being securely encased by apparatus 158—and controller 89 generates a signal to server 100 in response to detection of the threshold distance having been met. This may be the case, for example, upon initial encasement of mobile phone 12 by apparatus 158 and/or upon activation (i.e., opening) of an APP installed on mobile phone 12, and may in some embodiments continue, at least intermittently if not continuously, during the entire time that mobile phone 12 is encased by apparatus 158.

Proximity detector 165 may take the form, for example and without limitation, of a capacity proximity sensor, a photoelectric proximity sensor, or an inductive proximity sensor, which wirelessly detects whether the mobile phone 12 and proximity detector 165 (or other part of apparatus 158) are within the threshold distance from one another. In a specific embodiment, proximity detector 165 takes the form of a chip—such as a Near-Fields Communications (NFC) chip—that is configured to wirelessly interact with an electronic component of mobile phone 12, such as a phone chip (e.g., an NFC chip of mobile phone 12) or a readable (e.g., scannable) tag of that mobile phone 12. Alternatively, it is contemplated that a readable tag may be present in apparatus 158 and be configured to interact with a scanning/reading element (e.g., an NFC chip) of mobile phone 12 through an APP installed on that phone 12. In embodiments of that last type, the APP causes the reading performed by the NFC chip of mobile phone 12 to be communicated to the controller 89 of apparatus 158, which in turn generates a signal to server 100, as described above, upon determining whether the distance between apparatus 158 and mobile phone 12 is within the threshold value and/or if it exceeds that value. In a contemplated variation, the APP causes a wireless element (e.g., a WiFi chip or a Bluetooth® chip) of the mobile phone 12 itself to generate such type of signal to server 100 in response to the detection and subsequent determination of the distance, respectively, by the NFC chip and controller of the mobile phone 12 itself.

In a specific embodiment, the apparatus 158 includes a readable tag in the form of a chip, and more specifically in this example embodiment, of an NFC chip that during operation remains in passive mode. Another chip such as an NFC chip of the mobile phone 12, conversely, remains in active mode, and acts as a proximity detector that detects whether the distance between that NFC chip of mobile phone 12 (or another part of mobile phone 12) and the passive NFC chip of apparatus 158 is within a threshold distance. In that specific embodiment, either a controller of the mobile phone 12 itself or controller 89 of apparatus 158 generates a signal to server 100, in response to the distance detection effected by the NFC chip of mobile phone 12, with that signal either indicating that the distance is within the threshold value or that the distance exceeds the threshold value, or both. As explained above, a detected distance that is within the threshold value is indicative of the mobile phone 12 being securely enveloped by apparatus 158, while a detected distance that is greater than the threshold value is indicative of mobile phone 12 not being securely enveloped by apparatus 158.

Advantageously, embodiments in which detection of proximity between mobile phone 12 and apparatus 158 is effected wirelessly e.g., through a proximity sensor or through communication between a chip and other electronic components, provide a cleaner, more fool-proof operation than in embodiments in which a mechanical element such as a limit switch (e.g., limit switch 94 in the embodiment of FIGS. 2A-2C, and 3) may be used to detect whether the mobile phone 12 is encased within a device such as apparatus 158. Specifically, a mechanical switch could be impermissibly depressed and held down by a user through artificial means (means other than insertion of mobile phone 12 within the device), to thereby false convey that the mobile phone 12 is properly secured within the device. Wireless detection, on the other hand, does not permit such tampering.

While not shown, apparatus 158 may include a locking feature such as the locking feature—and variations thereof—described in connection with the embodiment of FIGS. 10A-10C, which would be effective to prevent the unauthorized removal of mobile phone 12 from the encasement provided by apparatus 158. In that contemplated embodiment that includes a locking feature, apparatus 158 may have two portions that are slidable with respect to one another, such as the illustrative encasement portions 142, 144 in the embodiment of FIGS. 10A-10C. Alternative embodiments are contemplated, however, in which apparatus 158 may differ structurally from the embodiment in FIGS. 10A-10C, and yet include a locking feature that is effective to prevent unauthorized separation of mobile phone 12 from apparatus 158. In that type of embodiment, operation of the locking feature may be controlled by a controller 89 similar to that described in connection with the embodiments of FIGS. 1-6, 7A, 7B, 8A-8C, and 9A-9C, or may instead be simpler type of controller, such as an electronic switch that is configured to receive data from the mobile phone 12 or from another source. A simple electronic switch may be desirable in order to minimize the complexity of construction and operation of such apparatus.

With continued reference to FIGS. 11A-11C, apparatus 158 may include a male connector 169 that is configured for insertion within a jack of mobile phone 12, such as power and/or data port of that mobile phone 12. Insertion of male connector 169 into that power and/or data port is effective to provide communication (e.g., exchange of signals/data) between components of electronic circuit 86 of apparatus 158 (e.g., controller 89) and electronic components of mobile phone 12, and further may be able to provide power to components of electronic circuit 86 of apparatus 158.

Embodiments are contemplated in which an encasing apparatus similar to apparatus 158 may have a readable chip in/on one of the walls making up that apparatus, or spanning two or more of those walls. That readable chip may for example be an NFC chip that is designated to remain dormant and therefore passive unless same is engaged (e.g., wirelessly, through induction) by an NFC chip of a mobile phone 12 enveloped by that encasing apparatus. Engagement of the NFC chip of mobile phone 12 with the passive NFC chip (or other type of chip) of the encasing apparatus is effective to allow the passive chip to communicate location, time, identification, and/or other type of information about the encasing apparatus to the NFC chip of mobile phone 12. That information may in turn be transmitted by the mobile phone 12 to server 100, which would thereby track usage, location, and other parameters of the encasing apparatus. In such contemplated embodiment, the passive chip of the encasing apparatus would not require any power or any communication with other components of the encasing apparatus, and therefore the encasing apparatus may obviate the need to include a controller (such as controller 89 in other embodiments) and further obviate the need to include a power source (such as a battery 88), which would lower the cost and simplify construction and operation of that encasing apparatus, when compared to embodiments that include a power source and/or a controller (such as those of FIGS. 11A-11C).

In those contemplated embodiments, the passive readable chip of the encasing apparatus may optionally use power and/or exchange data, if and when needed, from/with the mobile phone 12, for example through the physical connection provided by the male connector 169 received within a power/data port of mobile phone 12. A variation of those embodiments is contemplated in which the encasing apparatus includes a controller that is used for other functionality of the apparatus, but which is not operatively coupled at all to the passive readable chip of that encasing apparatus.

Referring now to FIGS. 12A, 12B, 12C, and 12D, those figures illustrate an embodiment of a privacy system made up of a portable communication and/or storage device in the form of a mobile phone 12, and an apparatus 170. As in other embodiments described herein, apparatus 170 at least partially encases or envelops mobile phone 12. Mobile phone 12 includes a power switch 182, as well as a pair volume buttons 184, an interactive display 186, and a pair of camera lenses 56, 67 similar in structure, relative location, and functionality to the like-numbered features in the embodiment of FIG. 3, for example, configured to selectively take digital impressions.

Apparatus 170 includes an upper part 190 that is slidably connected to a main, lower part 192, with separation of those two parts 190, 192 allowing insertion of mobile phone 12 into a holding area or encasement of apparatus 170, as well as removal of mobile phone 12 from that encasement. When parts 190, 192 are coupled to one another, a plurality of walls making up apparatus 170 defines an encasement of apparatus 170 that at least partially encloses mobile phone 12, as illustrated in the figures. Those walls include a pair of wall portions 200, 202 that respectively overlie the front and rear camera lenses 56, 67 of mobile phone 12, and are therefore effective to prevent or at least hinder the taking of digital impressions with those camera lenses 56, 67 when the mobile phone 12 is securely enveloped by apparatus 170.

Apparatus 170 includes a lock 205 that selectively secures mobile phone 12 to the encasement of apparatus 170 to thereby prevent unauthorized separation/removal of mobile phone 12 from apparatus 170. To that end, lock 205 has a locked state in which removal of mobile phone 12 from apparatus 170 is at least hindered, if not entirely prevented without destroying either the apparatus 170 or mobile phone 12, as well as an unlocked state in which such separation/removal is substantially unrestricted. In the locked state (FIGS. 12A, 12C and 12D), the mobile phone 12 is securely enveloped by the encasement provided by the walls making up apparatus 170, with wall portions 200, 202 preventing or at least hindering the taking of digital impressions with either of the camera lenses 56, 67, thereby making use of the mobile phone 12 compliant for use in a controlled environment.

Notably, in the locked state of lock 205, apparatus 170 otherwise permits normal, authorized use of mobile phone 12 in the controlled environment. For example, normal, authorized use may include using mobile phone 12 for making and receiving telephone calls, for watching or listening to streaming or pre-recorded video/audio media, for reading news, or otherwise for using one of the many APPS normally found pre-installed (by the manufacturer of phone 12) or user-installed in mobile phone 12. To that end, in the locked state of lock 205, apparatus 170 provides the user of mobile phone 12—in this illustrative embodiment and as a matter of example—unrestricted access to at least substantially an entirety of interactive display 186, as well as to the volume buttons 184 and to the power switch 182. As used herein, the term "unrestricted access" to a particular feature of phone 12 refers to direct or indirect access. Direct access, in that regard, is as shown in the example embodiment of FIGS. 12A-12D. Conversely, indirect access may include surfaces of features of the apparatus 170 itself that may be pushed, for example, and still result in the desired effect. For purposes of illustration only, an example of indirect unrestricted access is provided to the volume buttons 184 of mobile phone 12 via buttons 72 on side walls in the embodiment associated with FIG. 3. Similarly, indirect unrestricted access may be provided to the interactive display 186 through a screen protector or similar feature, which allows interactive access between the user and the mobile phone 12.

In another contemplated embodiment (not shown), access to the volume buttons 184 may not be provided at all. More specifically, in particular controlled environments it may be desirable for the mobile phone 12 to operate at a minimum volume or with no volume at all, for example, if general silence is desired (e.g., in a church or a chapel/meditation area of a hospital). Similarly, in the locked state shown in FIGS. 12A, 12C, and 12D, apparatus 170 in that example embodiment allows the user to access a power and data jack/port 210 of mobile phone 12 by providing an aperture in communication with the power and data jack/port. Other embodiments (not shown) may, however, obviate this feature—for example—to permit use of mobile phone 12 in the controlled environment only for a limited time e.g., until power runs out, thereby making lack of access to that power and data jack/port desirable.

With continued reference to FIGS. 12A-12D, the lock 205 in that particular embodiment is a mechanical type i.e., not requiring the use of electronic components. As explained below, however, other embodiments are contemplated in which a lock may include electronic components that cause that lock to toggle between the locked and unlocked states. The mechanical-type lock 205 illustrated in the figures includes a pair of appendages or legs 212 that extend in the interior of one of the walls of apparatus 170 and which are connected at one end to a rotatable key-engageable portion or drum 214 that is actuatable by a key 216 to toggle lock 205 between the locked and unlocked states. Specifically, key 216 includes a pair of pins 217 that are received within a pair of corresponding drum apertures 218, allowing drum 214 to rotate (arrow 219) between the locked and unlocked states.

Rotation of drum 214 in a first direction is effective to pull legs 212 toward drum 214, which in turn causes a pair of engaging ends 220 of legs 212 to engage and pull on a corresponding pair of claws 221 of lock 205 that snugly and firmly press against and retain the front bottom portion of mobile phone 12, thereby at least hindering removal of mobile phone 12 from apparatus 170 in the locked state of lock 205. Conversely, rotation of drum 214 (effectuated by key 216) in a second, opposite direction (i.e., opposite the direction indicated by arrow 219), is effective to release the hold of claws 221 on legs 212, thereby loosening the grip and pressure exerted on the mobile phone 12. That loosening action, in turn, allows unrestricted removal (separation) of mobile phone 12 from apparatus 170.

In the illustrated embodiment, insertion of the pins 217 of key 216 into drum apertures 218, cause a plate (not shown) within drum to be pushed out of place so as to allow rotation of drum 214 as explained above, so as to toggle between the locked and unlocked states. In an alternative embodiment, the pins 217 are magnetized and the plate discussed above is metallic. In that embodiment, insertion of pins 217 into drum apertures 218 is effective to pull (i.e., toward pins 217) that metallic plate, thereby allowing rotation of drum 214.

In another contemplated variation (not shown), rotation of the drum 214 is effected electronically. For example, rotation of the drum 214 may be controlled by a controller of apparatus 170 and to which drum 214 is operatively coupled (e.g., through a solenoid). The controller may be similar to controller 89 described above with reference to other embodiments herein. Toggling between the locked and unlocked states is carried out by the controller in response to receiving a signal generated within an APP of the mobile phone 12 or generated remotely by a server, for example. In that regard, apparatus 170 may include an electronic wireless communication element such as a WiFi or Bluetooth® chip, for example, capable of wirelessly receiving such type of signal. Alternatively, the controller may be able to receive an electronic signal associated with toggling the drum 214 through a direct connection between apparatus 170 and mobile phone 12. An example of such direct connection is in the form of a male connector 169 that is configured for insertion within the power/data jack 210 of mobile phone 12, such as in the embodiment associated with FIGS. 11A and 11B, above.

In other contemplated embodiments, apparatus 170 includes a proximity detector that interacts with the controller, which in turn controls toggling of lock 205 (e.g., through rotation of drum 214) between the locked and unlocked states. The structure, operation and types of the proximity detector in that contemplated embodiment may be similar to that of proximity detector 165 described above with respect to the embodiment associated with FIGS. 11A-11C.

It is to be understood that the lock described with respect to the embodiment of FIGS. 12A-12D is merely an example rather than being intended to be limiting. Thus, other types of lock are alternatively contemplated within the scope of the present description. Such types of alternative lock may be mechanical, electronic, magnetic, or any other type and may or may not include a rotatable element (such as rotatable drum 214) and work in a different manner altogether, so long as it provides unrestricted direct or indirect access to the power switch 182, as well as to substantially an entirety of the interactive display 186 of mobile phone 12 while in the locked state, all while blocking the taking of digital impressions with the one or more camera lenses (e.g., camera lenses 56, 67) of mobile phone 12. For example, and without limitation, a lock may take the form of the locking feature in the embodiment associated with FIGS. 11A-11C which works in a different manner from that of lock 205 in the embodiment of FIGS. 12A-12D.

The embodiment of FIGS. 11A-11C, like the one in FIGS. 12A-12D, similarly provides unrestricted direct or indirect access to the power switch 182, as well as to substantially an entirety of the interactive display 186 of mobile phone 12 while in the locked state, all while blocking the taking of digital impressions with the one or more camera lenses (e.g., camera lenses 56, 67) of mobile phone 12. In that regard, alternative embodiments are contemplated of privacy systems in which the mobile phone (or other portable communication or storage device) has only one camera lens or has camera lenses in a number greater than two. Such embodiments would include an apparatus enveloping such mobile phone, as described above, and which blocks all such camera lenses so as to prevent the taking of digital impressions with that mobile phone when the lock of the apparatus is in the locked state.

Embodiments are contemplated in which the lock is permanently coupled to the walls defining the encasement of the apparatus, such as in the embodiments of FIGS. 11A-11C and FIGS. 12A-12D but also those (not shown) in which the lock is a separate component altogether, which may be selectively wrapped around or otherwise brought into coupling with one or more walls of the apparatus so as to prevent removal/separation of mobile phone 12 from the apparatus as discussed above. A lock may even be integrally formed with the apparatus. Further, while not shown, it is contemplated that apparatus 170 may include an additional lock, that selectively prevents separation of upper and lower parts 190, 192 from one another after they are coupled so as to encase a mobile phone 12 or other type of portable communication or storage device. Such additional lock may be of the mechanical type, electronic type, or some other type similar or different in structure and/or operation from the lock 205 and contemplated variations thereof. If such additional lock is mechanical, it may require a key in order to selectively allow separation of parts 190, 192 when authorized—for example—once the user leaves the controlled environment. Alternatively, if that additional lock is electronic, it may work in conjunction or instead of lock 205, and toggle between locked and unlocked states simultaneously with toggling of lock 205 between locked and unlocked states. For example, that additional lock may toggle to the locked state together with lock 205 upon receiving a signal directly or wirelessly rom the mobile phone 12 (through an APP), or wirelessly from a remote location.

Yet other embodiments are contemplated similar to those illustrated in FIGS. 11A-11C or FIGS. 12A-12D, but which obviate a lock altogether. In those embodiments, once the apparatus at least partially encloses a portable communication or storage device (e.g., a mobile phone 12) in a secure manner, all of the camera lenses of that portable communication or storage device are completely blocked by permanently closed-off, solid wall portions of the apparatus so as to entirely prevent the taking of digital impressions with the one or more camera lenses of that device while enveloped/encased by the apparatus. Such wall portions therefore lack any shutters or other features to selectively allow the taking of digital impressions with the blocked camera lens(es). In that state, in which the apparatus securely partially or completely encloses the portable communication or storage device, the apparatus provides unrestricted direct or indirect access to the power switch 182, as well as to substantially an entirety of an interactive display 186 that may be part of that portable communication or storage device.

In those embodiments that obviate a lock, compliance within a controlled environment may require human monitoring of the portable communication or storage device within that environment to ensure that the apparatus is securely coupled to the device (i.e., it securely at least partially encloses/encases the portable communication or storage device). Such embodiments having shutter-free wall portions overlying the one or more camera lenses of the portable communication or storage device may be desirable to take away the ability of users in a controlled environment to selectively cause the shutters to open and take digital impressions irrespective of the circumstances or authorization to do so, which may be for example desirable in environments in which the taking of digital impressions is strictly forbidden.

The walls in such embodiments may further be free of any adhesives, in order to prevent any—even minor—damage to the surface of the portable communication or storage device upon removal. Alternative embodiments are contemplated of this type, notwithstanding, in which the walls of the apparatus are not free of adhesive but which instead have a mild, fully releasable adhesive capable of leaving no remnants or traces on the surface of the portable communication or storage device. Likewise, alternative embodiments are contemplated of apparatus that obviate a lock, as described above, but which include electronics to monitor compliance. Specifically, such apparatus may include a proximity detector, for example, similar in structure and functionality to that of the embodiment of FIGS. 11A-11C, which may take any of the forms described above. Such contemplated embodiments would thus generate a signal to a remote server, or even sound an alarm—for example if the electronics of the apparatus include a local alarm (not shown in the figures)—that would go off if the apparatus and portable communication or storage device (e.g., a mobile phone encased by the apparatus) are separated from one another without authorization in a controlled environment.

It is contemplated that the various embodiments and features described above, including variations thereof, may be combined with one another, even if a specific combination of features is not shown in one of the accompanying figures or described in association with one particular embodiment. From the above disclosure of the general principles of the present invention and the preceding detailed description of exemplifying embodiments, those skilled in the art will readily comprehend the various modifications to which this invention is susceptible. Accordingly, this invention is intended to be limited only by the scope of the following claims and equivalents thereof.

What is claimed is:

1. An apparatus for enveloping a portable communication or storage device having one or more camera lenses for taking digital impressions, a power switch, and an interactive display, comprising:
   a plurality of walls defining an encasement configured to at least partially enclose the portable communication or storage device, said plurality of walls including one or more wall portions configured to overlie all of said one or more camera lenses; and
   a lock coupled to said encasement, said lock having a locked state in which said lock hinders separation of said encasement from the portable communication or storage device, and an unlocked state in which said lock permits unrestricted separation of said encasement from the portable communication or storage device,
   wherein:
      in the locked state, said encasement provides a user of the portable communication or storage device unrestricted access to the power switch thereof,
      in the locked state, said encasement provides the user of the portable communication or storage device unrestricted access to substantially an entirety of the interactive display thereof,
      in the locked state, said encasement hinders the taking of digital impressions by said one or more camera lenses of the portable communication or storage device,
      said encasement is free of shutters, and
      said encasement is configured to at least partially enclose the portable communication or storage device in both the locked and unlocked states.

2. The apparatus of claim 1, wherein said lock is separable from said encasement.

3. The apparatus of claim 1, wherein said lock is permanently coupled to said encasement.

4. The apparatus of claim 1, wherein said encasement includes a controller and a proximity detector operatively coupled to said controller, said proximity detector being configured to wirelessly detect whether the apparatus is within a threshold distance from the portable communication or storage device.

5. The apparatus of claim 4, wherein said proximity detector includes a chip, said chip being configured to wirelessly communicate with the portable communication or storage device to detect whether said encasement is within the threshold distance from the portable communication or storage device.

6. The apparatus of claim 5, wherein said proximity detector is a Near-Fields Communications (NFC) chip.

7. The apparatus of claim 4, wherein said proximity detector is a proximity sensor.

8. The apparatus of claim 7, wherein said proximity sensor is one of a capacity proximity sensor, a photoelectric proximity sensor, or an inductive proximity sensor.

9. The apparatus of claim 4, wherein said controller is configured to generate a signal to a remote server in response to said proximity detector detecting said encasement being within the threshold distance from the portable communication or storage device.

10. The apparatus of claim 4, wherein said controller is configured to generate a signal to a remote server in response to said proximity detector failing to detect said encasement being within the threshold distance from the portable communication or storage device.

11. The apparatus of claim 4, wherein the threshold distance corresponds to the portable communication or storage device being securely enveloped by said encasement.

12. The apparatus of claim 1, wherein said encasement includes a readable chip associated with at least one of said plurality of walls for generating information about the apparatus.

13. The apparatus of claim 12, wherein said readable chip is a Near-Fields Communications (NFC) chip.

14. The apparatus of claim 12, wherein the apparatus is free of any controllers operatively coupled to said readable chip.

15. The apparatus of claim 12, wherein said readable chip is free of any coupling to a power source.

16. The apparatus of claim 1, wherein said lock includes a wireless communication element, said lock being configured to toggle between the locked and unlocked state thereof in response to a signal received by said wireless communication element.

17. The apparatus of claim 1, wherein said lock includes a wireless communication element configured for communication with the portable communication or storage device, said lock being configured to toggle between the locked and unlocked state thereof in response to a signal received by said wireless communication element from the portable communication or storage device.

18. The apparatus of claim 1, wherein said one or more wall portions are configured to overlie all of said one or more camera lenses in both the locked and unlocked states of said lock.

19. A privacy system comprising:
a portable communication or storage device having one or more camera lenses for taking digital impressions, a power switch, and an interactive display; and
an apparatus for enveloping said portable communication or storage device, said apparatus including:
(a) a plurality of walls defining an encasement configured to at least partially enclose said portable communication or storage device, said plurality of walls including one or more wall portions configured to overlie all of said one or more camera lenses, and
(b) a lock coupled to said encasement, said lock having a locked state in which said lock hinders separation of said encasement from said portable communication or storage device, and an unlocked state in which said lock permits unrestricted separation of said encasement from said portable communication or storage device,
wherein:
in the locked state, said encasement provides a user of said portable communication or storage device unrestricted access to the power switch thereof,
in the locked state, said encasement provides the user of said portable communication or storage device unrestricted access to substantially an entirety of the interactive display thereof,
in the locked state, said encasement hinders the taking of digital impressions by said one or more camera lenses of said portable communication or storage device,
said encasement is free of shutters in front of said one or more camera lenses, and
said encasement is configured to at least partially enclose said portable communication or storage device in both the locked and unlocked states.

20. An apparatus for enveloping a portable communication or storage device having one or more camera lenses for taking digital impressions, a power switch, and an interactive display, comprising:
a plurality of walls defining an encasement configured to at least partially enclose the portable communication or storage device, said plurality of walls including one or more wall portions configured to overlie all of said one or more camera lenses, said encasement including a controller and a proximity detector operatively coupled to said controller; and
a lock coupled to said encasement, said lock having a locked state in which said lock hinders separation of said encasement from the portable communication or storage device, and an unlocked state in which said lock permits unrestricted separation of said encasement from the portable communication or storage device,
wherein:
in the locked state, said encasement provides a user of the portable communication or storage device unrestricted access to the power switch thereof,
in the locked state, said encasement provides the user of the portable communication or storage device unrestricted access to substantially an entirety of the interactive display thereof,
in the locked state, said encasement hinders the taking of digital impressions by said one or more camera lenses of the portable communication or storage device, and
said controller is configured to generate a signal to a remote server in response to said proximity detector (1) detecting said encasement being within a threshold distance from the portable communication or storage device or (b) failing to detect said encasement being within a threshold distance from the portable communication or storage device.

* * * * *